United States Patent
Gholmieh et al.

(10) Patent No.: US 11,889,538 B2
(45) Date of Patent: Jan. 30, 2024

(54) TECHNIQUES FOR REDUCING SEMI-PERSISTENT SCHEDULING LATENCY

(71) Applicant: QUALCOMM Incorporated, San Diego, CA (US)

(72) Inventors: Ralph Akram Gholmieh, San Diego, CA (US); Sean Vincent Maschue, Encinitas, CA (US); Shailesh Patil, San Diego, CA (US); Cheol Hee Park, San Diego, CA (US); Tien Viet Nguyen, Bridgewater, NJ (US); Hamza Ijaz Abbasi, San Diego, CA (US); Ashish Shankar Iyer, San Diego, CA (US); Praveen Kumar Appani, San Diego, CA (US); Srinivasan Rajagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 17/248,732

(22) Filed: Feb. 4, 2021

(65) Prior Publication Data

US 2021/0243765 A1 Aug. 5, 2021

Related U.S. Application Data

(60) Provisional application No. 62/970,462, filed on Feb. 5, 2020.

(51) Int. Cl.
*H04W 72/53* (2023.01)
*H04W 68/00* (2009.01)
*H04W 72/0446* (2023.01)
*H04W 72/02* (2009.01)

(52) U.S. Cl.
CPC ........ *H04W 72/53* (2023.01); *H04W 68/005* (2013.01); *H04W 72/02* (2013.01); *H04W 72/0446* (2013.01)

(58) Field of Classification Search
CPC ........... H04W 72/0493; H04W 68/005; H04W 72/02; H04W 72/0446
See application file for complete search history.

(56) References Cited

U.S. PATENT DOCUMENTS

| | | | | |
|---|---|---|---|---|
| 2013/0077490 A1* | 3/2013 | Sela | ............... | H04B 7/1858 370/235 |
| 2017/0289733 A1* | 10/2017 | Rajagopal | ............... | H04L 67/12 |
| 2018/0049224 A1* | 2/2018 | Dinan | ............... | H04W 4/70 |
| 2019/0045507 A1* | 2/2019 | Sorrentino | ......... | H04W 72/042 |
| 2019/0149279 A1* | 5/2019 | Lee | ............... | H04W 28/0278 370/329 |

\* cited by examiner

*Primary Examiner* — Michael Thier
*Assistant Examiner* — Nevena Zecevic Sandhu
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may adjust a basic safety message generation periodicity based at least in part on a semi-persistent scheduling periodicity for transmitting basic safety messages. The UE may generate one or more basic safety messages based at least in part on the adjusted basic safety message generation periodicity. Numerous other aspects are provided.

30 Claims, 12 Drawing Sheets

TECHNIQUES FOR REDUCING SEMI-PERSISTENT SCHEDULING LATENCY

CROSS-REFERENCE TO RELATED APPLICATION

This patent application claims priority to U.S. Provisional Patent Application No. 62/970,462, filed on Feb. 5, 2020, entitled "TECHNIQUES FOR REDUCING SEMI-PERSISTENT SCHEDULING LATENCY," and assigned to the assignee hereof. The disclosure of the prior application is considered part of and is incorporated by reference into this patent application.

FIELD OF THE DISCLOSURE

Aspects of the present disclosure generally relate to wireless communication and to techniques for improving semi-persistent scheduling performance in terms of latency and probability of successful delivery.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include adjusting a basic safety message generation periodicity based at least in part on a semi-persistent scheduling (SPS) periodicity for transmitting messages, or on the set of allowed SPS periodicities for transmitting messages; and generating one or more basic safety messages based at least in part on the adjusted basic safety message generation periodicity.

In a first aspect, adjusting the basic safety message generation periodicity comprises rounding the basic safety message generation periodicity up or down to a multiple of a 100 millisecond periodicity. In a second aspect, alone or in combination with the first aspect, adjusting the basic safety message generation periodicity comprises rounding the basic safety message generation periodicity up or down to a multiple of the SPS periodicity. In a third aspect, alone or in combination with one or more of the first and second aspects, adjusting the basic safety message generation periodicity comprises rounding the basic safety message generation periodicity up or down to a nearest periodicity that is permitted by a specification.

In a fourth aspect, alone or in combination with one or more of the first through third aspects, the method includes receiving, from a modem of the UE and at a processor of the UE executing a safety application, an indication of an anchor time that is based at least in part on a resource selection for the safety application, and generating the one or more basic safety messages comprises generating, using the processor, a basic safety message of the one or more basic safety messages at an offset time prior to the anchor time and providing the basic safety message to the modem. In a fifth aspect, alone or in combination with one or more of the first through fourth aspects, the method includes generating, using the processor, another basic safety message of the one or more basic safety messages at the offset time prior to one or more periods of the SPS periodicity from the anchor time; and providing the other basic safety message to the modem.

In a sixth aspect, alone or in combination with one or more of the first through fifth aspects, the method includes receiving, at a modem of the UE, an indication of a resource reselection associated with a safety application that is associated with the one or more basic safety messages; determining, using the modem, an updated anchor time based at least in part on the resource reselection; and providing, from the modem and to a processor of the UE executing the safety application, an indication of the updated anchor time. In a seventh aspect, alone or in combination with one or more of the first through sixth aspects, generating the one or more basic safety messages comprises generating, using the processor, a basic safety message of the one or more basic safety messages at an offset time prior to the updated anchor time, where an amount of time between a time at which the basic safety message is to be transmitted and a time at which another basic safety message most recently generated by the UE is to be transmitted exceeds the SPS periodicity.

In an eighth aspect, alone or in combination with one or more of the first through seventh aspects, the method includes determining, using the processor, that transmission of a first basic safety message of the one or more basic safety messages at the updated anchor time will result in an amount of time between the updated anchor time and a time at which a second basic safety message most recently generated by the UE is to be transmitted exceeds the SPS periodicity; and generating, using the processor, a non-SPS basic safety message based at least in part on the determination that the transmission of the first basic safety message at the updated anchor time will result in the amount of time between the updated anchor time and the time at which the second basic safety message most recently generated by the UE is to be transmitted exceeds the SPS periodicity, wherein the non-SPS basic safety message is generated after generation of the first basic safety message and prior to generation of the second basic safety message.

In a ninth aspect, alone or in combination with one or more of the first through eighth aspects, the method includes determining, using the modem, that transmission of a first basic safety message of the one or more basic safety messages at the updated anchor time will result in an amount of time between the updated anchor time and a time at which a second basic safety message most recently generated by the UE is to be transmitted exceeds the SPS periodicity; and selecting, using the modem, a resource prior to the updated anchor time for transmission of the first basic safety message based at least in part on the determination that the transmission of the first basic safety message at the updated anchor time will result in the amount of time between the updated anchor time and the time at which the second basic safety message most recently generated by the UE is to be transmitted exceeds the SPS periodicity, wherein transmission of the first basic safety message in the selected resource is to satisfy the SPS periodicity.

In a tenth aspect, alone or in combination with one or more of the first through ninth aspects, the method includes receiving, from a modem of the UE and at a processor of the UE executing a safety application, an indication of respective transmit times for each of the one or more basic safety messages, and generating the one or more basic safety messages comprises generating, using the processor, the one or more basic safety messages at an offset time prior to the respective transmit times. In an eleventh aspect, alone or in combination with one or more of the first through tenth aspects, the method includes receiving, from the modem and at the processor, an indication of a non-SPS transmit time for transmission of a non-SPS basic safety message transmission between a first basic safety message of the one or more basic safety messages and a second basic safety message of the one or more basic safety messages; and generating, using the processor, the non-SPS basic safety message at the offset time prior to the non-SPS transmit time.

In a twelfth aspect, alone or in combination with one or more of the first through eleventh aspects, an amount of time between the non-SPS transmit time and a transmit time at which the second basic safety message is to be transmitted exceeds the SPS periodicity. In a thirteenth aspect, alone or in combination with one or more of the first through twelfth aspects, the method includes determining, using the modem, that transmission of a message at a non-SPS transmission due to a muting event for a SPS flow is needed; determining an optimal resource selection time for the non-SPS transmission based at least in part on a minimum scheduling delay T1 and a maximum scheduling delay T2, wherein T2 is based at least in part on a current load on the processor, and wherein the optimal resource selection time minimizes the maximum amount of time between successive transmission; and selecting a resource for the non-SPS transmission at the optimal resource selection time.

In a fourteenth aspect, alone or in combination with one or more of the first through thirteenth aspects, the method includes determining, using the processor, that transmission of the non-SPS basic safety message at the non-SPS transmit time will result in an amount of time between the non-SPS time and a transmit time at which the second basic safety message is to be transmitted exceeds the SPS periodicity; and generating, using the processor, another non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the other non-SPS basic safety message is generated after generation of the non-SPS basic safety message and prior to generation of the second basic safety message.

In a fifteenth aspect, alone or in combination with one or more of the first through fourteenth aspects, the method includes determining, using the processor, that transmission of the non-SPS basic safety message at the non-SPS transmit time will result in an amount of time between the non-SPS time and a transmit time at which the second basic safety message is to be transmitted exceeds the SPS periodicity; and selecting, using the modem, a resource prior to the non-SPS transmit time for transmission of the non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein transmission of the non-SPS basic safety message in the selected resource is to satisfy the SPS periodicity.

In a sixteenth aspect, alone or in combination with one or more of the first through fifteenth aspects, the method includes determining, using the processor, that transmission of the non-SPS basic safety message at the non-SPS transmit time will result in an amount of time between the non-SPS time and a transmit time at which the second basic safety message is to be transmitted exceeds the SPS periodicity; and selecting, using the modem, the non-SPS transmit time based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the non-SPS transmit time is within a threshold time range associated with the transmit time at which the second basic safety message is to be transmitted.

In a seventeenth aspect, alone or in combination with one or more of the first through sixteenth aspects, the method includes providing, using a processor of the UE executing a safety application and to a modem of the UE, a request for an adjusted SPS periodicity; configuring, using the modem, the adjusted SPS periodicity at a reselection opportunity; and receiving, using the processor, an indication of an anchor time for transmission of the one or more basic safety messages that is based at least in part on the adjusted SPS periodicity. In an eighteenth aspect, alone or in combination with one or more of the first through seventeenth aspects, the adjusted SPS periodicity is higher relative to the SPS periodicity, and generating the one or more basic safety messages comprises generating the one or more basic safety messages based at least in part on the SPS periodicity prior to the processor receiving the adjusted SPS periodicity.

In a nineteenth aspect, alone or in combination with one or more of the first through eighteenth aspects, the adjusted SPS periodicity is lower relative to the SPS periodicity, and the method includes generating, using the processor or the modem, one or more non-SPS basic safety messages at a frequency that is greater relative to the SPS periodicity prior to the processor receiving the adjusted SPS periodicity. In a twentieth aspect, alone or in combination with one or more of the first through nineteenth aspects, the method includes providing, using the processor and to the modem, a request for another adjusted SPS periodicity prior to receiving the indication of the anchor time.

In a twenty-first aspect, alone or in combination with one or more of the first through twentieth aspects, the reselection opportunity is based at least in part on a time of arrival of a most recent basic safety message of the one or more basic safety messages at the modem. In a twenty-second aspect, alone or in combination with one or more of the first through twenty-first aspects, the method includes providing, using a processor of the UE executing a safety application and to a modem of the UE, a request for an adjusted SPS periodicity; configuring, using the modem, the adjusted SPS periodicity at a reselection opportunity; and until the reselection opportunity, transmit any packets that do not fit into a reserved SPS transmission into non-SPS transmissions.

In a twenty-third aspect, alone or in combination with one or more of the first through twenty-second aspects, the safety application generates basic safety messages at the latest adjusted SPS periodicity at all times. In a twenty-fourth aspect, alone or in combination with one or more of the first through twenty-third aspects, the reselection opportunity is based at least in part on a time of arrival of a most recent basic safety message of the one or more basic safety messages at the modem.

In some aspects, a UE for wireless communication may include a memory and one or more processors operatively coupled to the memory. The memory and the one or more processors may be configured to adjust a basic safety message generation periodicity based at least in part on an SPS periodicity for transmitting basic safety messages; and generate one or more basic safety messages based at least in part on the adjusted basic safety message generation periodicity.

In a first aspect, adjusting the basic safety message generation periodicity comprises rounding the basic safety message generation periodicity up or down to a multiple of a 100 millisecond periodicity. In a second aspect, alone or in combination with the first aspect, adjusting the basic safety message generation periodicity comprises rounding the basic safety message generation periodicity up or down to a multiple of the SPS periodicity. In a third aspect, alone or in combination with one or more of the first and second aspects, adjusting the basic safety message generation periodicity comprises rounding the basic safety message generation periodicity up or down to a nearest periodicity that is permitted by a specification.

In a fourth aspect, alone or in combination with one or more of the first through third aspects, the one or more processors are further configured to receive, from a modem of the UE and at a processor of the UE executing a safety application, an indication of an anchor time that is based at least in part on a resource selection for the safety application, and generate the one or more basic safety messages comprises generating, using the processor, a basic safety message of the one or more basic safety messages at an offset time prior to the anchor time and providing the basic safety message to the modem. In a fifth aspect, alone or in combination with one or more of the first through fourth aspects, the one or more processors are further configured to generate, using the processor, another basic safety message of the one or more basic safety messages at the offset time prior to one or more periods of the SPS periodicity from the anchor time; and provide the other basic safety message to the modem.

In a sixth aspect, alone or in combination with one or more of the first through fifth aspects, the one or more processors are further configured to receive, at a modem of the UE, an indication of a resource reselection associated with a safety application that is associated with the one or more basic safety messages; determine, using the modem, an updated anchor time based at least in part on the resource reselection; and provide, from the modem and to a processor of the UE executing the safety application, an indication of the updated anchor time. In a seventh aspect, alone or in combination with one or more of the first through sixth aspects, generating the one or more basic safety messages comprises generating, using the processor, a basic safety message of the one or more basic safety messages at an offset time prior to the updated anchor time, where an amount of time between a time at which the basic safety message is to be transmitted and a time at which another basic safety message most recently generated by the UE is to be transmitted exceeds the SPS periodicity.

In an eighth aspect, alone or in combination with one or more of the first through seventh aspects, the one or more processors are further configured to determine, using the processor, that transmission of a first basic safety message of the one or more basic safety messages at the updated anchor time will result in an amount of time between the updated anchor time and a time at which a second basic safety message most recently generated by the UE is to be transmitted exceeds the SPS periodicity; and generate, using the processor, a non-SPS basic safety message based at least in part on the determination that the transmission of the first basic safety message at the updated anchor time will result in the amount of time between the updated anchor time and the time at which the second basic safety message most recently generated by the UE is to be transmitted exceeds the SPS periodicity, wherein the non-SPS basic safety message is generated after generation of the first basic safety message and prior to generation of the second basic safety message.

In a ninth aspect, alone or in combination with one or more of the first through eighth aspects, the one or more processors are further configured to determine, using the modem, that transmission of a first basic safety message of the one or more basic safety messages at the updated anchor time will result in an amount of time between the updated anchor time and a time at which a second basic safety message most recently generated by the UE is to be transmitted exceeds the SPS periodicity; and select, using the modem, a resource prior to the updated anchor time for transmission of the first basic safety message based at least in part on the determination that the transmission of the first basic safety message at the updated anchor time will result in the amount of time between the updated anchor time and the time at which the second basic safety message most recently generated by the UE is to be transmitted exceeds the SPS periodicity, wherein transmission of the first basic safety message in the selected resource is to satisfy the SPS periodicity.

In a tenth aspect, alone or in combination with one or more of the first through ninth aspects, the one or more processors are further configured to receive, from a modem of the UE and at a processor of the UE executing a safety application, an indication of respective transmit times for each of the one or more basic safety messages, and generate the one or more basic safety messages comprises generating, using the processor, the one or more basic safety messages at an offset time prior to the respective transmit times. In an eleventh aspect, alone or in combination with one or more of the first through tenth aspects, the one or more processors are further configured to receive, from the modem and at the processor, an indication of a non-SPS transmit time for transmission of a non-SPS basic safety message transmission between a first basic safety message of the one or more basic safety messages and a second basic safety message of the one or more basic safety messages; and generate, using the processor, the non-SPS basic safety message at the offset time prior to the non-SPS transmit time.

In a twelfth aspect, alone or in combination with one or more of the first through eleventh aspects, an amount of time between the non-SPS transmit time and a transmit time at which the second basic safety message is to be transmitted exceeds the SPS periodicity. In a thirteenth aspect, alone or in combination with one or more of the first through twelfth aspects, the one or more processors are further configured to determine, using the modem, that transmission of a message at a non-SPS transmission due to a muting event for a SPS flow is needed; determine an optimal resource selection time for the non-SPS transmission based at least in part on a minimum scheduling delay T1 and a maximum scheduling delay T2, wherein T2 is based at least in part on a current load on the processor, and wherein the optimal resource selection time minimizes the maximum amount of time between successive transmission; and select a resource for the non-SPS transmission at the optimal resource selection time.

In a fourteenth aspect, alone or in combination with one or more of the first through thirteenth aspects, the one or more processors are further configured to determine, using the processor, that transmission of the non-SPS basic safety message at the non-SPS transmit time will result in an amount of time between the non-SPS time and a transmit time at which the second basic safety message is to be transmitted exceeds the SPS periodicity; and generate, using the processor, another non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the other non-SPS basic safety message is generated after generation of the non-SPS basic safety message and prior to generation of the second basic safety message.

In a fifteenth aspect, alone or in combination with one or more of the first through fourteenth aspects, the one or more processors are further configured to determine, using the processor, that transmission of the non-SPS basic safety message at the non-SPS transmit time will result in an amount of time between the non-SPS time and a transmit time at which the second basic safety message is to be transmitted exceeds the SPS periodicity; and select, using the modem, a resource prior to the non-SPS transmit time for transmission of the non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein transmission of the non-SPS basic safety message in the selected resource is to satisfy the SPS periodicity.

In a sixteenth aspect, alone or in combination with one or more of the first through fifteenth aspects, the one or more processors are further configured to determine, using the processor, that transmission of the non-SPS basic safety message at the non-SPS transmit time will result in an amount of time between the non-SPS time and a transmit time at which the second basic safety message is to be transmitted exceeds the SPS periodicity; and select, using the modem, the non-SPS transmit time based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the non-SPS transmit time is within a threshold time range associated with the transmit time at which the second basic safety message is to be transmitted.

In a seventeenth aspect, alone or in combination with one or more of the first through sixteenth aspects, the one or more processors are further configured to provide, using a processor of the UE executing a safety application and to a modem of the UE, a request for an adjusted SPS periodicity; configuring, using the modem, the adjusted SPS periodicity at a reselection opportunity; and receive, using the processor, an indication of an anchor time for transmission of the one or more basic safety messages that is based at least in part on the adjusted SPS periodicity. In an eighteenth aspect, alone or in combination with one or more of the first through seventeenth aspects, the adjusted SPS periodicity is higher relative to the SPS periodicity, and generating the one or more basic safety messages comprises generating the one or more basic safety messages based at least in part on the SPS periodicity prior to the processor receiving the adjusted SPS periodicity.

In a nineteenth aspect, alone or in combination with one or more of the first through eighteenth aspects, the adjusted SPS periodicity is lower relative to the SPS periodicity, and the one or more processors are further configured to generate, using the processor or the modem, one or more non-SPS basic safety messages at a frequency that is greater relative to the SPS periodicity prior to the processor receiving the adjusted SPS periodicity. In a twentieth aspect, alone or in combination with one or more of the first through nineteenth aspects, the one or more processors are further configured to provide, using the processor and to the modem, a request for another adjusted SPS periodicity prior to receiving the indication of the anchor time.

In a twenty-first aspect, alone or in combination with one or more of the first through twentieth aspects, the reselection opportunity is based at least in part on a time of arrival of a most recent basic safety message of the one or more basic safety messages at the modem. In a twenty-second aspect, alone or in combination with one or more of the first through twenty-first aspects, the one or more processors are further configured to provide, using a processor of the UE executing a safety application and to a modem of the UE, a request for an adjusted SPS periodicity; configuring, using the modem, the adjusted SPS periodicity at a reselection opportunity; and until the reselection opportunity, transmit any packets that do not fit into a reserved SPS transmission into non-SPS transmissions.

In a twenty third aspect, alone or in combination with one or more of the first through twenty second aspects, the safety application generates basic safety messages at the latest adjusted SPS periodicity at all times. In a twenty fourth aspect, alone or in combination with one or more of the first through twenty third aspects, the reselection opportunity is based at least in part on a time of arrival of a most recent basic safety message of the one or more basic safety messages at the modem.

In some aspects, a non-transitory computer-readable medium may store one or more instructions for wireless communication. The one or more instructions, when executed by one or more processors of a UE, may cause the one or more processors to adjust a basic safety message generation periodicity based at least in part on an SPS periodicity for transmitting basic safety messages; and generate one or more basic safety messages based at least in part on the adjusted basic safety message generation periodicity.

In a first aspect, adjusting the basic safety message generation periodicity comprises rounding the basic safety message generation periodicity up or down to a multiple of a 100 millisecond periodicity. In a second aspect, alone or in combination with the first aspect, adjusting the basic safety message generation periodicity comprises rounding the basic safety message generation periodicity up or down to a multiple of the SPS periodicity. In a third aspect, alone or in combination with one or more of the first and second aspects, adjusting the basic safety message generation periodicity comprises rounding the basic safety message generation periodicity up or down to a nearest periodicity that is permitted by a specification.

In a fourth aspect, alone or in combination with one or more of the first through third aspects, the one or more instructions, when executed by the one or more processors, further cause the one or more processors to receive, from a modem of the UE and at a processor of the UE executing a safety application, an indication of an anchor time that is based at least in part on a resource selection for the safety application, and generate the one or more basic safety messages comprises generating, using the processor, a basic safety message of the one or more basic safety messages at an offset time prior to the anchor time and providing the basic safety message to the modem. In a fifth aspect, alone or in combination with one or more of the first through fourth aspects, the one or more instructions, when executed by the one or more processors, further cause the one or more processors to generate, using the processor, another basic safety message of the one or more basic safety messages at the offset time prior to one or more periods of the SPS periodicity from the anchor time; and provide the other basic safety message to the modem.

In a sixth aspect, alone or in combination with one or more of the first through fifth aspects, the one or more instructions, when executed by the one or more processors, further cause the one or more processors to receive, at a modem of the UE, an indication of a resource reselection associated with a safety application that is associated with the one or more basic safety messages; determine, using the modem, an updated anchor time based at least in part on the resource reselection; and provide, from the modem and to a processor of the UE executing the safety application, an indication of the updated anchor time. In a seventh aspect, alone or in combination with one or more of the first through sixth aspects, generating the one or more basic safety messages comprises generating, using the processor, a basic safety message of the one or more basic safety messages at an offset time prior to the updated anchor time, where an amount of time between a time at which the basic safety message is to be transmitted and a time at which another basic safety message most recently generated by the UE is to be transmitted exceeds the SPS periodicity.

In an eighth aspect, alone or in combination with one or more of the first through seventh aspects, the one or more instructions, when executed by the one or more processors, further cause the one or more processors to determine, using the processor, that transmission of a first basic safety message of the one or more basic safety messages at the updated anchor time will result in an amount of time between the updated anchor time and a time at which a second basic safety message most recently generated by the UE is to be transmitted exceeds the SPS periodicity; and generate, using the processor, a non-SPS basic safety message based at least in part on the determination that the transmission of the first basic safety message at the updated anchor time will result in the amount of time between the updated anchor time and the time at which the second basic safety message most recently generated by the UE is to be transmitted exceeds the SPS periodicity, wherein the non-SPS basic safety message is generated after generation of the first basic safety message and prior to generation of the second basic safety message.

In a ninth aspect, alone or in combination with one or more of the first through eighth aspects, the one or more instructions, when executed by the one or more processors, further cause the one or more processors to determine, using the modem, that transmission of a first basic safety message of the one or more basic safety messages at the updated anchor time will result in an amount of time between the updated anchor time and a time at which a second basic safety message most recently generated by the UE is to be transmitted exceeds the SPS periodicity; and select, using the modem, a resource prior to the updated anchor time for transmission of the first basic safety message based at least in part on the determination that the transmission of the first basic safety message at the updated anchor time will result in the amount of time between the updated anchor time and the time at which the second basic safety message most recently generated by the UE is to be transmitted exceeds the SPS periodicity, wherein transmission of the first basic safety message in the selected resource is to satisfy the SPS periodicity.

In a tenth aspect, alone or in combination with one or more of the first through ninth aspects, the one or more instructions, when executed by the one or more processors, further cause the one or more processors to receive, from a modem of the UE and at a processor of the UE executing a safety application, an indication of respective transmit times for each of the one or more basic safety messages, and generate the one or more basic safety messages comprises generating, using the processor, the one or more basic safety messages at an offset time prior to the respective transmit times. In an eleventh aspect, alone or in combination with one or more of the first through tenth aspects, the one or more instructions, when executed by the one or more processors, further cause the one or more processors to receive, from the modem and at the processor, an indication of a non-SPS transmit time for transmission of a non-SPS basic safety message transmission between a first basic safety message of the one or more basic safety messages and a second basic safety message of the one or more basic safety messages; and generate, using the processor, the non-SPS basic safety message at the offset time prior to the non-SPS transmit time.

In a twelfth aspect, alone or in combination with one or more of the first through eleventh aspects, an amount of time between the non-SPS transmit time and a transmit time at which the second basic safety message is to be transmitted exceeds the SPS periodicity. In a thirteenth aspect, alone or in combination with one or more of the first through twelfth aspects, the one or more instructions, when executed by the one or more processors, further cause the one or more processors to determine, using the modem, that transmission of a message at a non-SPS transmission due to a muting event for a SPS flow is needed; determine an optimal resource selection time for the non-SPS transmission based at least in part on a minimum scheduling delay T1 and a maximum scheduling delay T2, wherein T2 is based at least in part on a current load on the processor, and wherein the optimal resource selection time minimizes the maximum amount of time between successive transmission; and select a resource for the non-SPS transmission at the optimal resource selection time.

In a fourteenth aspect, alone or in combination with one or more of the first through thirteenth aspects, the one or more instructions, when executed by the one or more processors, further cause the one or more processors to determine, using the processor, that transmission of the non-SPS basic safety message at the non-SPS transmit time will result in an amount of time between the non-SPS time and a transmit time at which the second basic safety message is to be transmitted exceeds the SPS periodicity; and generate, using the processor, another non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the other non-SPS basic safety message is generated after generation of the non-SPS basic safety message and prior to generation of the second basic safety message.

In a fifteenth aspect, alone or in combination with one or more of the first through fourteenth aspects, the one or more instructions, when executed by the one or more processors, further cause the one or more processors to determine, using the processor, that transmission of the non-SPS basic safety message at the non-SPS transmit time will result in an amount of time between the non-SPS time and a transmit time at which the second basic safety message is to be transmitted exceeds the SPS periodicity; and select, using the modem, a resource prior to the non-SPS transmit time for transmission of the non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein transmission of the non-SPS basic safety message in the selected resource is to satisfy the SPS periodicity.

In a sixteenth aspect, alone or in combination with one or more of the first through fifteenth aspects, the one or more instructions, when executed by the one or more processors, further cause the one or more processors to determine, using the processor, that transmission of the non-SPS basic safety message at the non-SPS transmit time will result in an amount of time between the non-SPS time and a transmit time at which the second basic safety message is to be transmitted exceeds the SPS periodicity; and select, using the modem, the non-SPS transmit time based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the non-SPS transmit time is within a threshold time range associated with the transmit time at which the second basic safety message is to be transmitted.

In a seventeenth aspect, alone or in combination with one or more of the first through sixteenth aspects, the one or more instructions, when executed by the one or more processors, further cause the one or more processors to provide, using a processor of the UE executing a safety application and to a modem of the UE, a request for an adjusted SPS periodicity; configuring, using the modem, the adjusted SPS periodicity at a reselection opportunity; and receive, using the processor, an indication of an anchor time for transmission of the one or more basic safety messages that is based at least in part on the adjusted SPS periodicity. In an eighteenth aspect, alone or in combination with one or more of the first through seventeenth aspects, the adjusted SPS periodicity is higher relative to the SPS periodicity, and generating the one or more basic safety messages comprises generating the one or more basic safety messages based at least in part on the SPS periodicity prior to the processor receiving the adjusted SPS periodicity.

In a nineteenth aspect, alone or in combination with one or more of the first through eighteenth aspects, the adjusted SPS periodicity is lower relative to the SPS periodicity, and the one or more instructions, when executed by the one or more processors, further cause the one or more processors to generate, using the processor or the modem, one or more non-SPS basic safety messages at a frequency that is greater relative to the SPS periodicity prior to the processor receiving the adjusted SPS periodicity. In a twentieth aspect, alone or in combination with one or more of the first through nineteenth aspects, the one or more instructions, when executed by the one or more processors, further cause the one or more processors to provide, using the processor and to the modem, a request for another adjusted SPS periodicity prior to receiving the indication of the anchor time.

In a twenty-first aspect, alone or in combination with one or more of the first through twentieth aspects, the reselection opportunity is based at least in part on a time of arrival of a most recent basic safety message of the one or more basic safety messages at the modem. In a twenty-second aspect, alone or in combination with one or more of the first through twenty-first aspects, the one or more instructions, when executed by the one or more processors, further cause the one or more processors to provide, using a processor of the UE executing a safety application and to a modem of the UE, a request for an adjusted SPS periodicity; configuring, using the modem, the adjusted SPS periodicity at a reselection opportunity; and until the reselection opportunity, transmit any packets that do not fit into a reserved SPS transmission into non-SPS transmissions.

In a twenty-third aspect, alone or in combination with one or more of the first through twenty-second aspects, the safety application generates basic safety messages at the latest adjusted SPS periodicity at all times. In a twenty-fourth aspect, alone or in combination with one or more of the first through twenty-third aspects, the reselection opportunity is based at least in part on a time of arrival of a most recent basic safety message of the one or more basic safety messages at the modem.

In some aspects, an apparatus for wireless communication may include means for adjusting a basic safety message generation periodicity based at least in part on an SPS periodicity for transmitting basic safety messages; and means for generating one or more basic safety messages based at least in part on the adjusted basic safety message generation periodicity.

In a first aspect, adjusting the basic safety message generation periodicity comprises rounding the basic safety message generation periodicity up or down to a multiple of a 100 millisecond periodicity. In a second aspect, alone or in combination with the first aspect, adjusting the basic safety message generation periodicity comprises rounding the basic safety message generation periodicity up or down to a multiple of the SPS periodicity. In a third aspect, alone or in combination with one or more of the first and second aspects, adjusting the basic safety message generation periodicity comprises rounding the basic safety message generation periodicity up or down to a nearest periodicity that is permitted by a specification.

In a fourth aspect, alone or in combination with one or more of the first through third aspects, the apparatus includes means for receiving, from a modem of the apparatus and at a processor of the apparatus executing a safety application, an indication of an anchor time that is based at least in part on a resource selection for the safety application, and means for generating the one or more basic safety messages comprises generating, using the processor, a basic safety message of the one or more basic safety messages at an offset time prior to the anchor time and providing the basic safety message to the modem. In a fifth aspect, alone or in combination with one or more of the first through fourth aspects, the apparatus includes means for generating, using the processor, another basic safety message of the one or more basic safety messages at the offset time prior to one or more periods of the SPS periodicity from the anchor time; and means for providing the other basic safety message to the modem.

In a sixth aspect, alone or in combination with one or more of the first through fifth aspects, the apparatus includes means for receiving, at a modem of the apparatus, an indication of a resource reselection associated with a safety application that is associated with the one or more basic safety messages; means for determining, using the modem, an updated anchor time based at least in part on the resource reselection; and means for providing, from the modem and to a processor of the apparatus executing the safety application, an indication of the updated anchor time. In a seventh aspect, alone or in combination with one or more of the first through sixth aspects, generating the one or more basic safety messages comprises generating, using the processor, a basic safety message of the one or more basic safety messages at an offset time prior to the updated anchor time, where an amount of time between a time at which the basic safety message is to be transmitted and a time at which another basic safety message most recently generated by the apparatus is to be transmitted exceeds the SPS periodicity.

In an eighth aspect, alone or in combination with one or more of the first through seventh aspects, the apparatus includes means for determining, using the processor, that transmission of a first basic safety message of the one or more basic safety messages at the updated anchor time will result in an amount of time between the updated anchor time and a time at which a second basic safety message most recently generated by the apparatus is to be transmitted exceeds the SPS periodicity; and means for generating, using the processor, a non-SPS basic safety message based at least in part on the determination that the transmission of the first basic safety message at the updated anchor time will result in the amount of time between the updated anchor time and the time at which the second basic safety message most recently generated by the apparatus is to be transmitted exceeds the SPS periodicity, wherein the non-SPS basic safety message is generated after generation of the first basic safety message and prior to generation of the second basic safety message.

In a ninth aspect, alone or in combination with one or more of the first through eighth aspects, the apparatus includes means for determining, using the modem, that transmission of a first basic safety message of the one or more basic safety messages at the updated anchor time will result in an amount of time between the updated anchor time and a time at which a second basic safety message most recently generated by the apparatus is to be transmitted exceeds the SPS periodicity; and means for selecting, using the modem, a resource prior to the updated anchor time for transmission of the first basic safety message based at least in part on the determination that the transmission of the first basic safety message at the updated anchor time will result in the amount of time between the updated anchor time and the time at which the second basic safety message most recently generated by the apparatus is to be transmitted exceeds the SPS periodicity, wherein transmission of the first basic safety message in the selected resource is to satisfy the SPS periodicity.

In a tenth aspect, alone or in combination with one or more of the first through ninth aspects, the apparatus includes means for receiving, from a modem of the apparatus and at a processor of the apparatus executing a safety application, an indication of respective transmit times for each of the one or more basic safety messages, and means for generating the one or more basic safety messages comprises generating, using the processor, the one or more basic safety messages at an offset time prior to the respective transmit times. In an eleventh aspect, alone or in combination with one or more of the first through tenth aspects, the apparatus includes means for receiving, from the modem and at the processor, an indication of a non-SPS transmit time for transmission of a non-SPS basic safety message transmission between a first basic safety message of the one or more basic safety messages and a second basic safety message of the one or more basic safety messages; and means for generating, using the processor, the non-SPS basic safety message at the offset time prior to the non-SPS transmit time.

In a twelfth aspect, alone or in combination with one or more of the first through eleventh aspects, an amount of time between the non-SPS transmit time and a transmit time at which the second basic safety message is to be transmitted exceeds the SPS periodicity. In a thirteenth aspect, alone or in combination with one or more of the first through twelfth aspects, the apparatus includes means for determining, using the modem, that transmission of a message at a non-SPS transmission due to a muting event for a SPS flow is needed; means for determining an optimal resource selection time for the non-SPS transmission based at least in part on a minimum scheduling delay T1 and a maximum scheduling delay T2, wherein T2 is based at least in part on a current load on the processor, and wherein the optimal resource selection time minimizes the maximum amount of time between successive transmission; and means for selecting a resource for the non-SPS transmission at the optimal resource selection time.

In a fourteenth aspect, alone or in combination with one or more of the first through thirteenth aspects, the apparatus includes means for determining, using the processor, that transmission of the non-SPS basic safety message at the non-SPS transmit time will result in an amount of time between the non-SPS time and a transmit time at which the second basic safety message is to be transmitted exceeds the SPS periodicity; and means for generating, using the processor, another non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the other non-SPS basic safety message is generated after generation of the non-SPS basic safety message and prior to generation of the second basic safety message.

In a fifteenth aspect, alone or in combination with one or more of the first through fourteenth aspects, the apparatus includes means for determining, using the processor, that transmission of the non-SPS basic safety message at the non-SPS transmit time will result in an amount of time between the non-SPS time and a transmit time at which the second basic safety message is to be transmitted exceeds the SPS periodicity; and means for selecting, using the modem, a resource prior to the non-SPS transmit time for transmission of the non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein transmission of the non-SPS basic safety message in the selected resource is to satisfy the SPS periodicity.

In a sixteenth aspect, alone or in combination with one or more of the first through fifteenth aspects, the apparatus includes means for determining, using the processor, that transmission of the non-SPS basic safety message at the non-SPS transmit time will result in an amount of time between the non-SPS time and a transmit time at which the second basic safety message is to be transmitted exceeds the SPS periodicity; and means for selecting, using the modem, the non-SPS transmit time based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the non-SPS transmit time is within a threshold time range associated with the transmit time at which the second basic safety message is to be transmitted.

In a seventeenth aspect, alone or in combination with one or more of the first through sixteenth aspects, the apparatus includes means for providing, using a processor of the UE executing a safety application and to a modem of the UE, a request for an adjusted SPS periodicity; means for configuring, using the modem, the adjusted SPS periodicity at a reselection opportunity; and means for receiving, using the processor, an indication of an anchor time for transmission of the one or more basic safety messages that is based at least in part on the adjusted SPS periodicity. In an eighteenth aspect, alone or in combination with one or more of the first through seventeenth aspects, the adjusted SPS periodicity is higher relative to the SPS periodicity, and generating the one or more basic safety messages comprises generating the one or more basic safety messages based at least in part on the SPS periodicity prior to the processor receiving the adjusted SPS periodicity.

In a nineteenth aspect, alone or in combination with one or more of the first through eighteenth aspects, the adjusted SPS periodicity is lower relative to the SPS periodicity, and the apparatus includes means for generating, using the processor or the modem, one or more non-SPS basic safety messages at a frequency that is greater relative to the SPS periodicity prior to the processor receiving the adjusted SPS periodicity. In a twentieth aspect, alone or in combination with one or more of the first through nineteenth aspects, the apparatus includes means for providing, using the processor and to the modem, a request for another adjusted SPS periodicity prior to receiving the indication of the anchor time.

In a twenty-first aspect, alone or in combination with one or more of the first through twentieth aspects, the reselection opportunity is based at least in part on a time of arrival of a most recent basic safety message of the one or more basic safety messages at the modem. In a twenty-second aspect, alone or in combination with one or more of the first through twenty-first aspects, the apparatus includes means for providing, using a processor of the UE executing a safety application and to a modem of the UE, a request for an adjusted SPS periodicity; means for configuring, using the modem, the adjusted SPS periodicity at a reselection opportunity; and until the reselection opportunity, means for transmitting any packets that do not fit into a reserved SPS transmission into non-SPS transmissions.

In a twenty-third aspect, alone or in combination with one or more of the first through twenty-second aspects, the safety application generates basic safety messages at the latest adjusted SPS periodicity at all times. In a twenty-fourth aspect, alone or in combination with one or more of the first through twenty-third aspects, the reselection opportunity is based at least in part on a time of arrival of a most recent basic safety message of the one or more basic safety messages at the modem.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
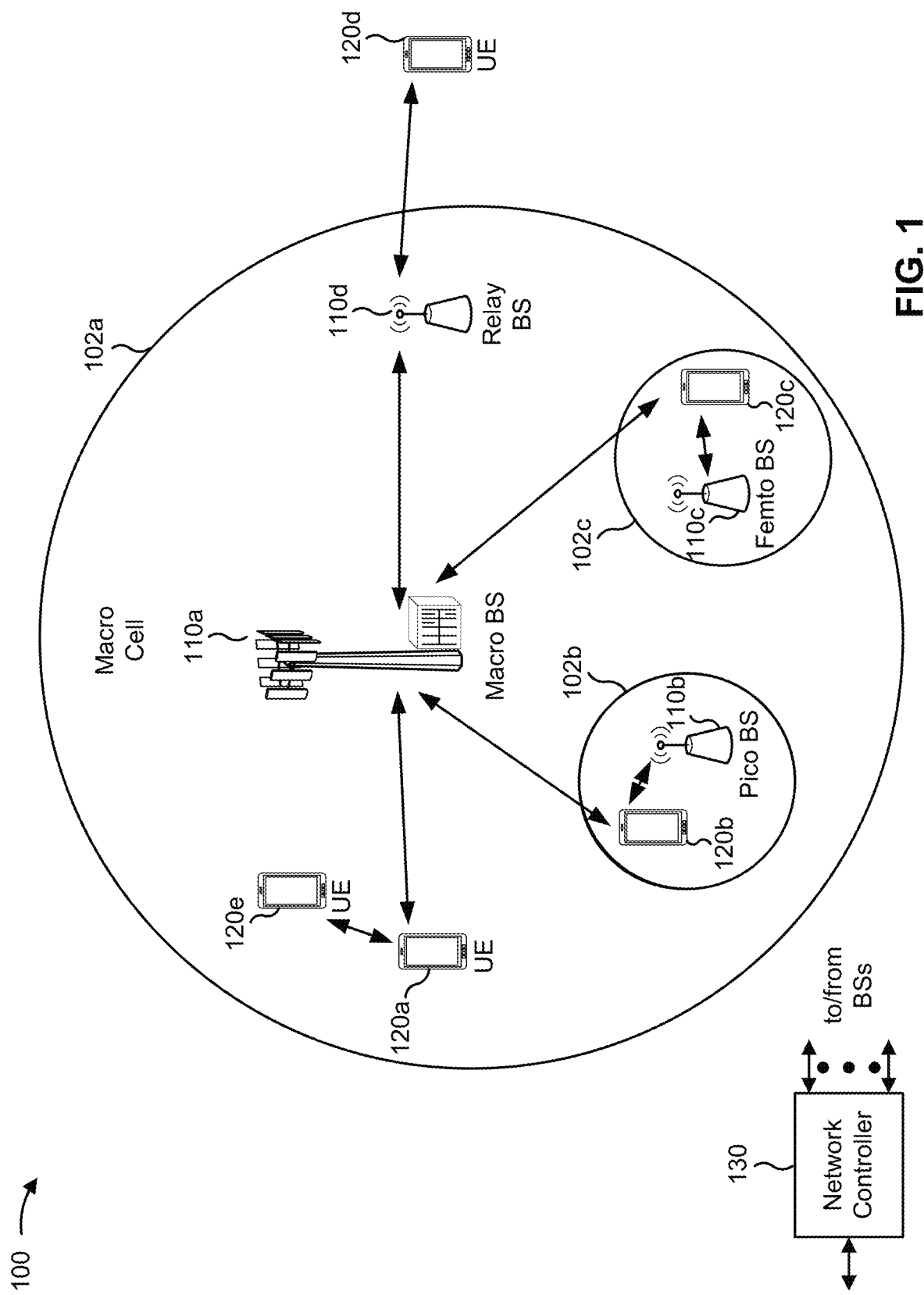
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations (BSs) 110 (shown as BS 110a, BS 110b, BS 110c, and BS 110d) and other network entities. ABS is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
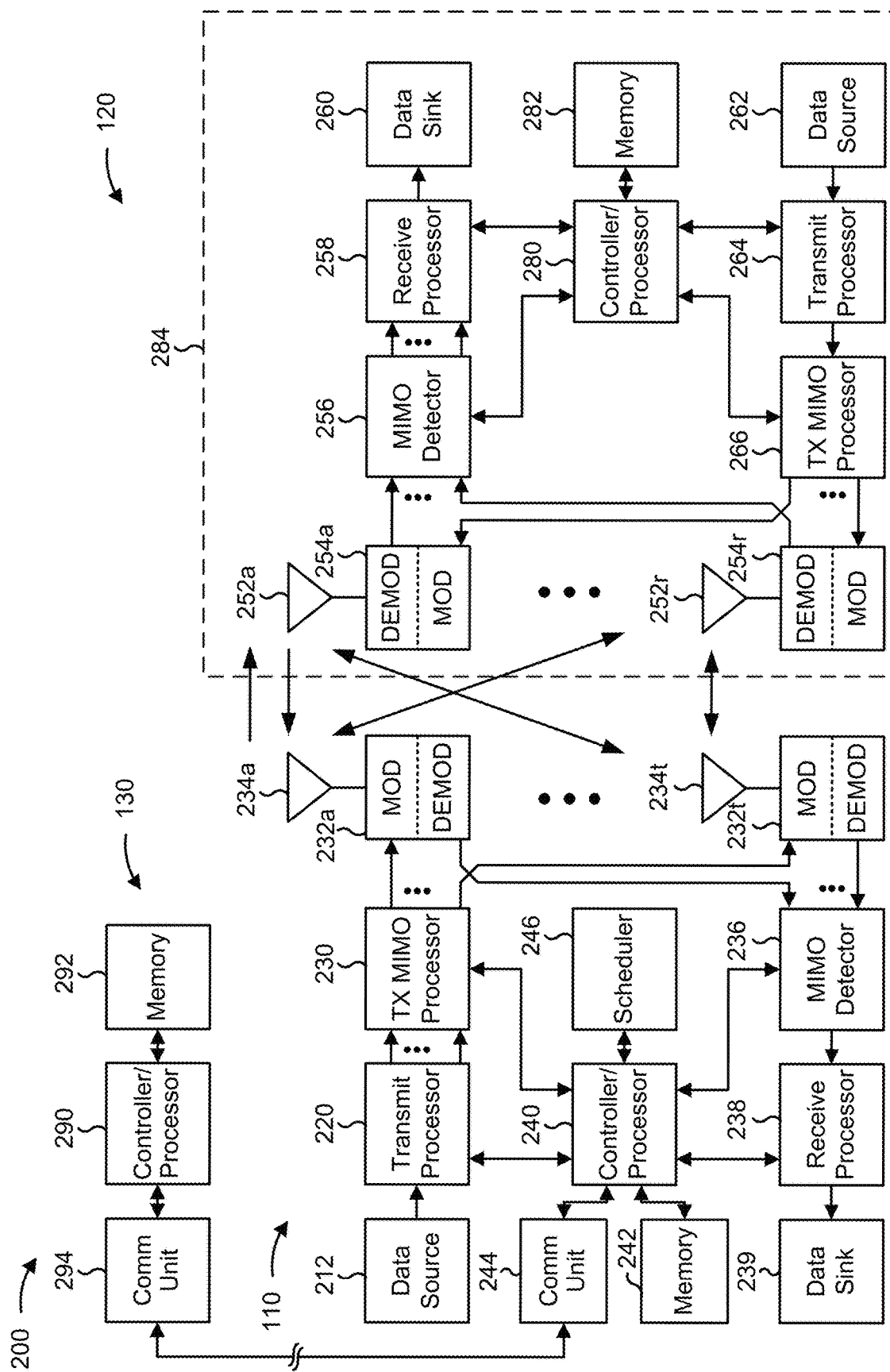
FIG. 2 is a diagram illustrating an example of a base station in communication with a user equipment (UE) in a wireless network, in accordance with the present disclosure.

FIG. 2 is a diagram illustrating an example 200 of base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) and/or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP) parameter, a received signal strength indicator (RSSI) parameter, a reference signal received quality (RSRQ) parameter, and/ or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/ processor 280 of UE 120, and/or any other component(s) of FIG. 2 may perform one or more techniques associated with reducing semi-persistent scheduling (SPS) latency, as described in more detail elsewhere herein. For example, controller/processor 240 of base station 110, controller/ processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8 and/or other processes as described herein. A scheduler 246 may schedule UEs for data transmission on the downlink and/or uplink.

In some aspects, UE 120 may include means for adjusting a basic safety message generation periodicity based at least in part on an SPS periodicity for transmitting basic safety messages, means for generating one or more basic safety messages based at least in part on the adjusted basic safety message generation periodicity, and/or the like. In some aspects, UE 120 may include means for receiving, from a modem of the UE 120 and at a processor of the UE 120 executing a safety application, an indication of an anchor time that is based at least in part on a resource selection for the safety application, means for generating, using the processor, a basic safety message of the one or more basic safety messages at an offset time prior to the anchor time, means for providing the basic safety message to the modem, and/or the like. In some aspects, UE 120 may include means for receiving, at a modem of the UE 120, an indication of a resource reselection associated with a safety application that is associated with the one or more basic safety messages, means for determining, using the modem, an updated anchor time based at least in part on the resource reselection, means for providing, from the modem and to a processor of the UE executing the safety application, an indication of the updated anchor time, and/or the like.

In some aspects, UE 120 may include means for receiving, from a modem of the UE 120 and at a processor of the UE executing a safety application, an indication of respective transmit times for each of the one or more basic safety messages, wherein the respective transmit times are based at least in part on a resource selection for the safety application and the SPS periodicity, means for generating, using the processor, the one or more basic safety messages at an offset time prior to the respective transmit times, and/or the like. In some aspects, UE 120 may include means for providing, using a processor of the UE 120 executing a safety application and to a modem of the UE 120, a request for an adjusted SPS periodicity, means for configuring, using the modem, the adjusted SPS periodicity at a reselection opportunity, means for receiving, using the processor, an indication of an anchor time for transmission of the one or more basic safety messages that is based at least in part on the adjusted SPS periodicity, and/or the like.

In some aspects, UE 120 may include means for providing, using a processor of the UE 120 executing a safety application and to a modem of the UE 120, a request for an adjusted SPS periodicity, means for configuring, using the modem, the adjusted SPS periodicity at a reselection opportunity, means for, until the reselection opportunity, transmitting any packets that do not fit into a reserved SPS transmission into non-SPS transmissions, and/or the like.

In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In a cellular V2X (C-V2X) deployment, UEs may communicate directly on a sidelink to share information (e.g., from a vehicle associated with a UE to any entity that may affect the vehicle, such as another vehicle, and vice versa). A safety application of a UE may share information with a safety application on another UE by transmitting a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like. A basic safety message may include information about vehicle position, heading, speed, safety alerts, and other information relating to a vehicle's state and predicted path. Thus, UEs in a C-V2X deployment may transmit basic safety messages for purposes of autonomous travel, collision detection and avoidance, law enforcement and medical personnel message relaying, and/or the like.

A modem of a UE (e.g., a C-V2X modem or another type of modem) may unicast, broadcast, multicast, and/or the like a basic safety message to one or more other UEs. A safety application executed on a processor (e.g., an application processor or another type of processor) of the UE may generate basic safety messages in a semi-persistent manner (e.g., at a particular interval or basic safety message generation periodicity), and may provide the basic safety messages to the modem for transmission on a sidelink. The modem may packetize, encode, modulate, and/or otherwise process the basic safety messages for transmission.

The modem of the UE may schedule or reserve sidelink resources for transmission of basic safety messages at an SPS periodicity. These sidelink resources may be referred to as SPS resources, and may include time-domain resources (e.g., symbols, slots, subframes, and/or the like) and/or frequency-domain resources (e.g., resource elements, subcarriers, component carriers, and/or the like). In this case, an SPS resource for transmitting a basic safety message may occur each SPS period. In some cases, the basic safety message generation periodicity of the processor executing the safety application and the SPS periodicity scheduled or reserved by the modem may result in inefficient use of SPS resources, may cause an increase in information age of basic safety messages, and/or the like. For example, a misalignment of the basic safety message generation periodicity and the SPS periodicity may result in an increased quantity of unused SPS sidelink resources (e.g., SPS sidelink resources that are skipped over for basic safety message transmission).

As another example, the processor may generate a basic safety message too far in advance of an SPS resource for transmission of the basic safety message, which may increase the information age (the amount of time since the generation of the basic safety message) of the information included in the basic safety message. As the information age of the information included in the basic safety message increases, the information becomes stale, out-of-date, or less accurate.

Some aspects described herein provide techniques and apparatuses for reducing semi-persistent scheduling latency in C-V2X and other sidelink-based deployments. In some aspects, a UE may align the basic safety message generation periodicity, and/or other types of messages that are sent periodically on an SPS flow, of a processor executing a safety application and an SPS periodicity for transmitting basic safety messages, and then align the generation times of the safety messages with the transmission times of the resources selected for SPS transmission such that information age of the basic safety messages is reduced and/or the quantity of unused SPS resources is reduced.

Moreover, the modem of the UE may provide the processor with an anchor time or transmit time, both of which may indicate a time at which a basic safety message is to be transmitted in an SPS resource. In this way, the processor may generate a basic safety message at an offset from the anchor time or transmit time in a manner that reduces the amount of time between generation and transmission of the basic safety message. This reduces the information age of the information included in the basic safety message, which prevents or reduces the likelihood that the information will become stale, out-of-date, or inaccurate. In some aspects, the processor and the modem of the UE may use other techniques to reduce information age and/or SPS scheduling latency, such as generating and transmitting non-SPS basic safety messages in scenarios in which an anchor time or transmit time is updated, scheduling an SPS resource within an SPS period in scenarios in which an anchor time or transmit time is updated, and/or the like.

Figure 3A:
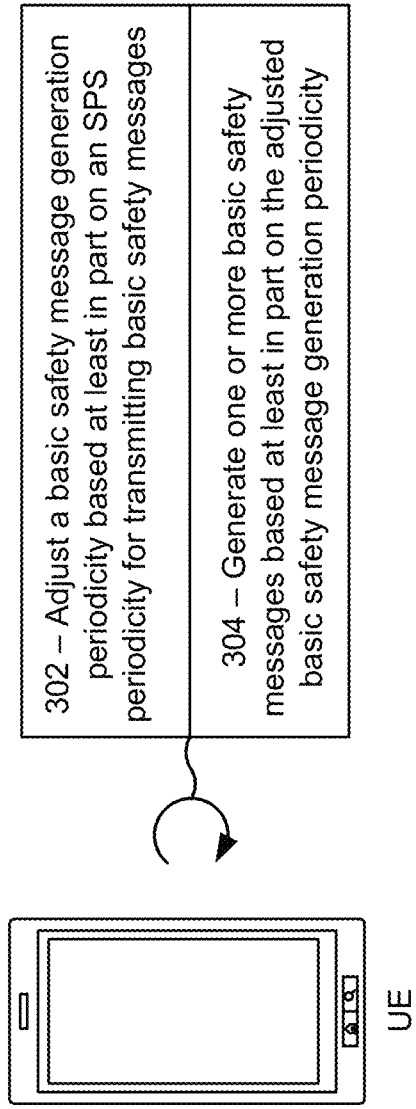
FIGS. 3A and 3B are diagrams illustrating an example of adjusting a basic safety message generation periodicity, in accordance with the present disclosure.
Figure 3B:
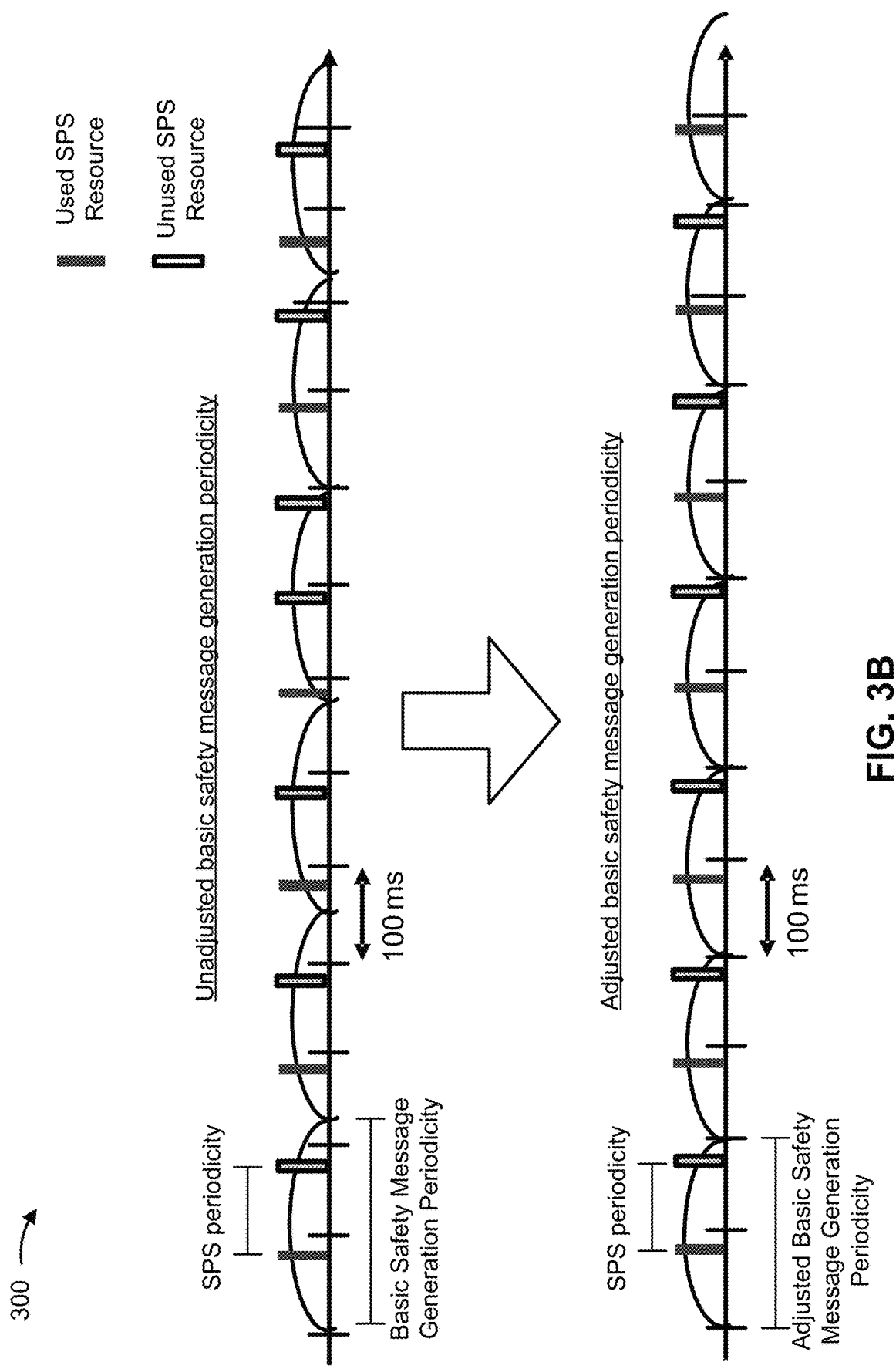

FIGS. 3A and 3B are diagrams illustrating one or more examples 300 of adjusting a basic safety message generation periodicity, in accordance with the present disclosure. As shown in FIGS. 3A and 3B, example(s) 300 may include a UE (e.g., UE 120). In some aspects, the UE may be deployed in a wireless network, such as wireless network 100.

In some aspects, the UE may be deployed in a C-V2X deployment or another type of deployment in which the UE communicates with other UEs on a sidelink. In this case, the UE may include a processor (e.g., a controller/processor 280) and a memory (e.g., memory 282) which may store and execute a safety application. The processor may generate basic safety messages for the safety application and may provide the basic safety messages to a modem of the UE.

The modem of the UE may be implemented by a receive processor (e.g., receive processor 258), a transmit processor (e.g., transmit processor 264), a controller/processor (e.g., controller/processor 280), a memory (e.g., memory 282), a modem component that includes one or more of a receive processor, a transmit processor, a controller/processor, a memory, an integrated circuit, an application specific integrated circuit (ASIC), and/or the like. The modem may be capable of packetizing the basic safety messages, encoding packets, modulating the encoded packets, and/or performing other baseband processing of the basic safety messages for transmission on the sidelink.

In some aspects, the processor executing the safety application may generate basic safety messages based at least in part on a basic safety message generation periodicity. For example, the processor may generate a basic safety message at an interval that occurs based at least in part on the basic safety message generation periodicity. In some aspects, the basic safety message generation periodicity may be selected based at least in part on congestion control in the wireless network (e.g., using a congestion control algorithm and/or other techniques). The modem may reserve or schedule SPS resources on the sidelink for transmission of the basic safety messages. In some aspects, the modem may reserve or schedule the SPS resources such that the SPS resources occur based at least in part on an SPS periodicity, where each SPS resource occurs at an interval that is based at least in part on the SPS periodicity.

As shown in FIG. 3A, and by reference number 302, the UE (e.g., the processor executing the safety application) may adjust the basic safety message generation periodicity based at least in part on the SPS periodicity to reduce the quantity of unused SPS resources scheduled by the modem, and/or to align transmissions with the reserved periodicity thus reducing the information age, and/or to enable SPS reservations that at greater than 100 ms since generation periodicities that are not aligned with SPS transmission times may require reservation periodicity that are no more than the allowed delay (e.g., 100 ms) because basic safety messages generated at drifting generation times relative to the reservation are to be served within the delay budget (e.g., 100 ms) from their delivery to the CV2X stack.

In some aspects, the UE may adjust the basic safety message generation periodicity such that the basic safety message generation periodicity is aligned with the SPS periodicity. For example, if the SPS periodicity indicates that an SPS resource occurs every 100 ms, the UE may adjust the basic safety message generation periodicity such that the processor generates a basic safety message every 100 ms.

In some aspects, the UE may adjust the basic safety message generation periodicity by rounding (e.g., wither up or down or to closest) the basic safety message generation periodicity to a multiple of the SPS periodicity. For example, if the SPS periodicity is 100 ms (e.g., an SPS resource occurs every 100 ms), and the basic safety message generation periodicity is 230 ms (e.g., a basic safety message is generated every 155 ms), the UE may round (up or down) the basic safety message generation periodicity to 100 ms or 200 ms. In some aspects, the UE may round the basic safety message generation periodicity to the nearest multiple of the SPS periodicity.

In some aspects, if the SPS periodicity is less than a threshold (e.g., 100 ms or another threshold), the UE may adjust the basic safety message generation periodicity by rounding up the basic safety message generation periodicity to the nearest multiple of the SPS periodicity. In some aspects, the UE may adjust the basic safety message generation periodicity by rounding (e.g., up or down) the basic safety message generation periodicity to the nearest basic safety message generation periodicity permitted for the UE (e.g., as indicated in a specification, a table, in signaling received by the UE, and/or the like).

In some aspects, the UE may adopt a strategy of either rounding to closest target periodicity, or round up to closest, or round down to closest. Rounding down may increase the load but ensures that safety messages are generated at least as frequently as in the non-rounding generator. Rounding to closest should ensure that the overall load in the system remains similar to the load in case the non-rounding generator is used. Rounding up may ensure a lower load in the system at the expense of slightly longer latencies.

As further shown in FIG. 3A, and by reference number 304, the UE (e.g., the processor executing the safety application) may generate one or more basic safety messages based at least in part on the adjusted basic safety message generation periodicity. For example, the UE may generate a basic safety message at each interval of the basic safety message generation periodicity.

FIG. 3B illustrates an example of an unadjusted basic safety message generation periodicity and an adjusted basic safety message generation periodicity. Other examples of unadjusted basic safety message generation periodicities may be adjusted to adjusted basic safety message generation periodicities using the techniques described herein.

As shown in FIG. 3B, an example unadjusted basic safety message generation periodicity may be 230 ms. With an example SPS periodicity of 100 ms, a basic safety message is typically generated and transmitted every other SPS resource. However, in some cases, two SPS resources may go unused between basic safety message transmissions.

As further shown in FIG. 3B, an example adjusted basic safety message generation periodicity may be 200 ms. In this example, the unadjusted basic safety message generation periodicity was rounded down to a multiple of the 100 ms SPS periodicity, which eliminates the cases where two SPS resources are unused between basic safety message transmissions.

In this way, the UE may align the basic safety message generation periodicity of a processor executing a safety application and an SPS periodicity for transmitting basic safety messages such that information age of the basic safety messages is reduced, the quantity of unused SPS resources is reduced, and/or the like. In another alternative, the UE may change the SPS reservation to 200 ms, thus liberating the intermediate resources for use by other devices.

As indicated above, FIGS. 3A and 3B are provided as one or more examples. Other examples may differ from what is described with respect to FIGS. 3A and 3B.

Figure 4:
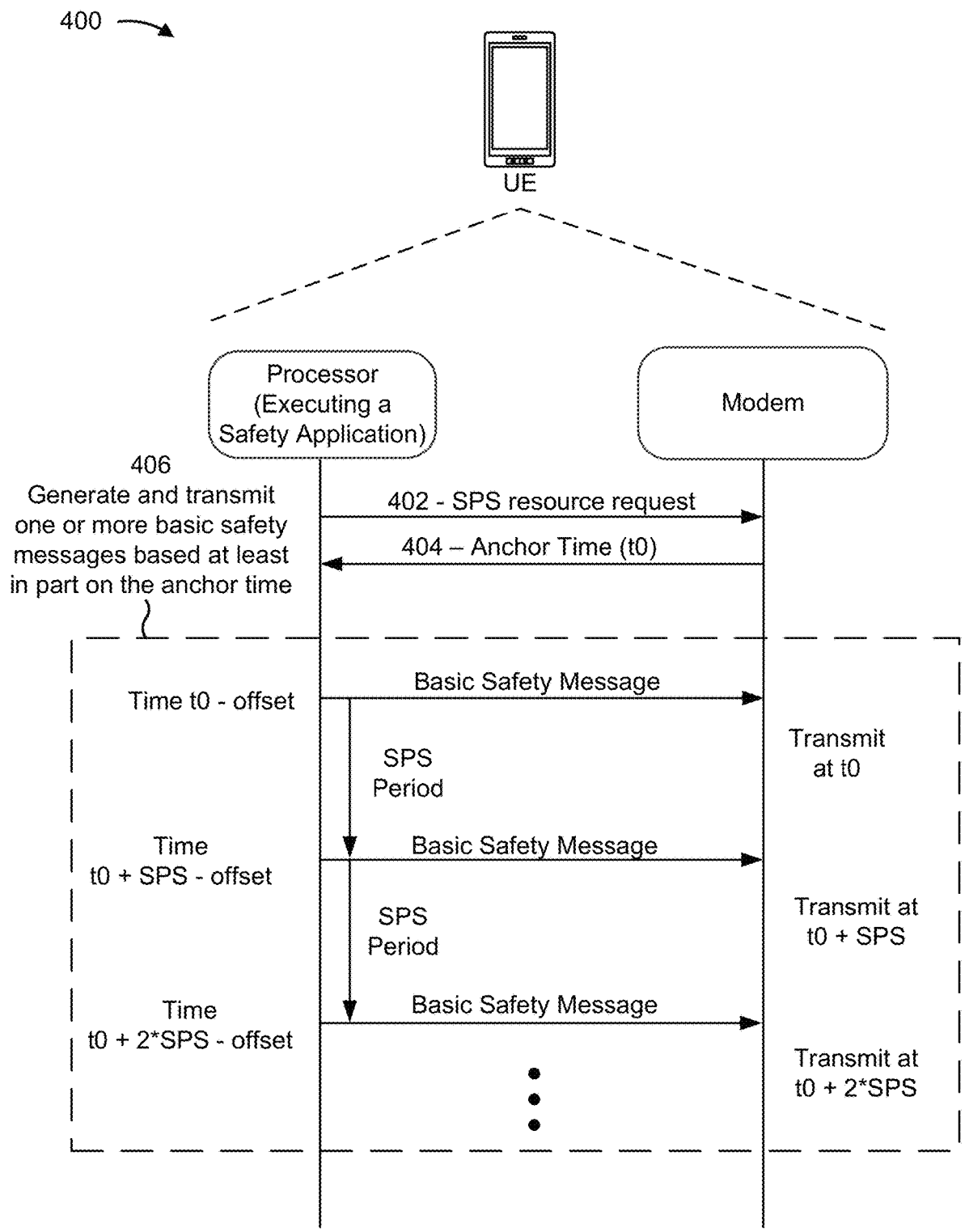
FIGS. 4, 5, and 6A-6C are diagrams illustrating examples of reducing semi-persistent scheduling (SPS) latency, in accordance with the present disclosure.

FIG. 4 is a diagram illustrating an example 400 of reducing semi-persistent scheduling latency, in accordance with the present disclosure. As shown in FIG. 4, examples 400 may include a UE (e.g., UE 120). In some aspects, the UE may be deployed in a wireless network, such as wireless network 100.

In some aspects, the UE may be deployed in a C-V2X deployment or another type of deployment in which the UE communicates with other UEs on a sidelink. In this case, the UE may include a processor (e.g., a controller/processor 280) and a memory (e.g., memory 282) which may store and execute a safety application. The processor may generate basic safety messages for the safety application and may provide the basic safety messages to a modem of the UE.

The modem of the UE may be implemented by a receive processor (e.g., receive processor 258), a transmit processor (e.g., transmit processor 264), a controller/processor (e.g., controller/processor 280), a memory (e.g., memory 282), a modem component that includes one or more of a receive processor, a transmit processor, a controller/processor, a memory, an integrated circuit, an ASIC, and/or the like. The modem may be capable of packetizing the basic safety messages, encoding packets, modulating the encoded packets, and/or performing other baseband processing of the basic safety messages for transmission on the sidelink.

In some aspects, the processor executing the safety application may generate basic safety messages based at least in part on a basic safety message generation periodicity, which may be adjusted using one or more of the techniques described above in connection with FIGS. 3A and 3B. For example, the processor may generate a basic safety message at an interval that occurs based at least in part on the basic safety message generation periodicity. The modem may reserve or schedule SPS resources on the sidelink for transmission of the basic safety messages. In some aspects, the modem may reserve or schedule the SPS resources such that the SPS resources occur based at least in part on an SPS periodicity, where each SPS resource occurs at an interval that is based at least in part on the SPS periodicity.

As shown in FIG. 4, and by reference number 402, to transmit basic safety messages, the processor executing the safety application may provide an SPS resource request to the modem to reserve, configure, or schedule SPS resources at an SPS periodicity. The modem may receive the request, and may reserve, configure, or schedule the SPS resources based at least in part on the SPS periodicity.

As further shown in FIG. 4, and by reference number 404, the modem may provide the processor with an indication of an anchor time (indicated in FIG. 4 as t0) that is based at least in part on the SPS resources. The anchor time may be a time at which a first basic safety message after an SPS resource reservation is configured or scheduled to be transmitted. Subsequent basic safety messages may be transmitted at SPS periods from the anchor time (e.g., at time t0+one SPS period, at time t0+two SPS periods, and so on).

As further shown in FIG. 4, and by reference number 406, the processor may receive the indication of the anchor time, and the UE may generate and transmit one or more basic safety messages based at least in part on the anchor time. In some aspects, the processor executing the safety application may generate the one or more basic safety messages based at least in part on an offset relative to the anchor time, based at least in part on the SPS periodicity, based at least in part on a basic safety message generation periodicity, and/or the like.

The offset time may be configured by the UE such that basic safety messages are generated as close to the time at which the basic safety messages are to be transmitted as possible to reduce or minimize information age of the basic safety messages. In some aspects, the offset may be based at least in part on a processing capability of the processor. For example, the offset time may be based on an amount of time the processor takes to generate basic safety messages.

As illustrated in FIG. 4, the processor may generate the first basic safety message at time t0−(minus) the offset and may provide the first basic safety message to the modem for transmission at t0. The processor may generate a second basic safety message at time t0+one SPS period−the offset and may provide the second basic safety message to the modem for transmission at time t0+one SPS period. The processor may generate a third basic safety message at time t0+two SPS periods−the offset and may provide the second basic safety message to the modem for transmission at time t0+two SPS periods. The processor may generate additional basic safety messages in a similar manner. In this way, each basic safety message is generated and transmitted according to the SPS periodicity starting from the anchor time.

In this way, the modem of the UE may provide the processor with an anchor time, which may indicate a time, based at least in part on an SPS periodicity, at which a basic safety message is to be transmitted in an SPS resource. In this way, the processor may generate a basic safety message at an offset from the anchor time in a manner that reduces the amount of time between generation and transmission of the basic safety message. This reduces the information age of the information included in the basic safety message, which prevents or reduces the likelihood that the information will become stale, out-of-date, or inaccurate.

As indicated above, FIG. 4 is provided as an example. Other examples may differ from what is described with respect to FIG. 4.

Figure 5:
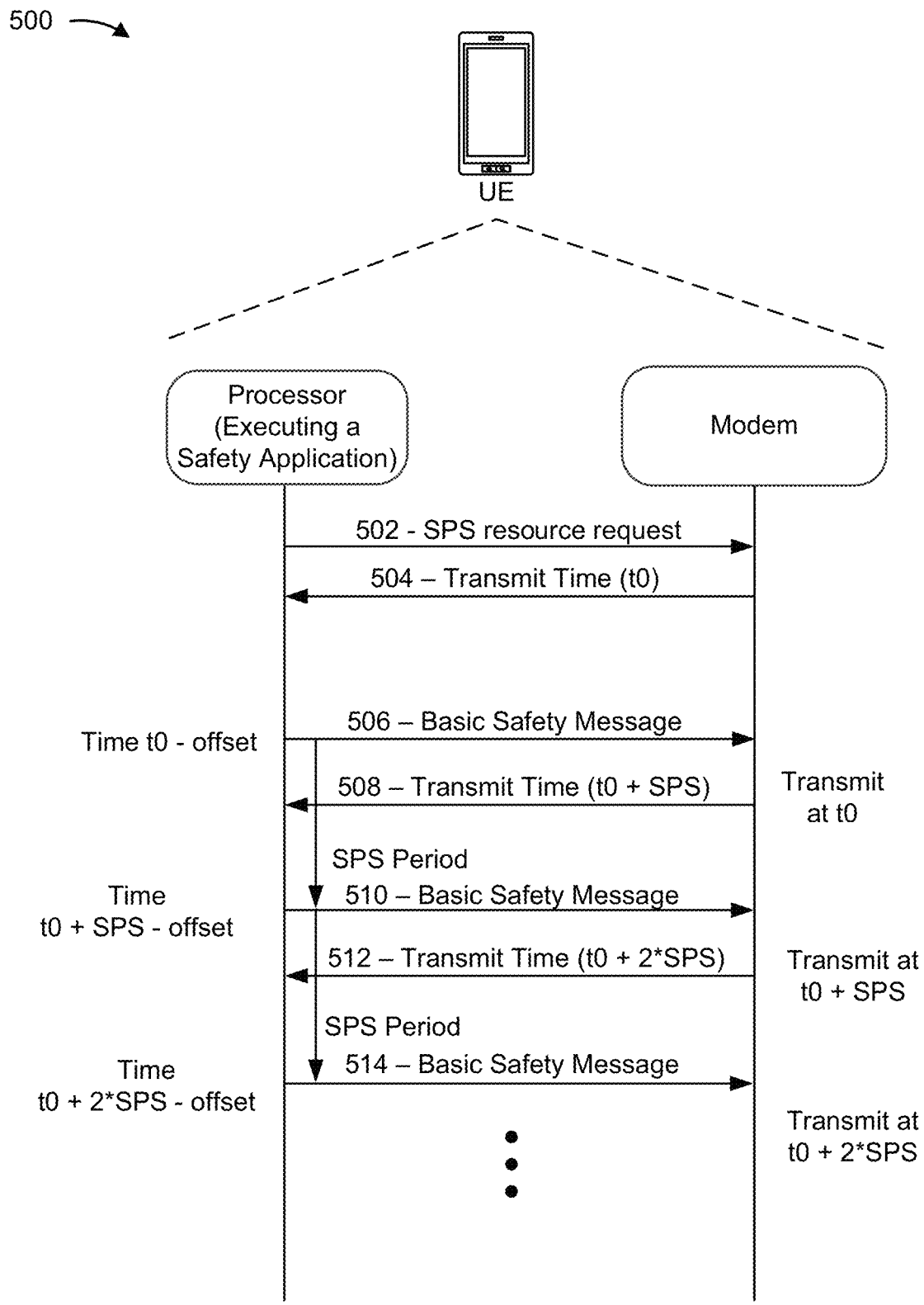

FIG. 5 is a diagram illustrating an example 500 of reducing semi-persistent scheduling latency, in accordance with the present disclosure. As shown in FIG. 5, example 500 may include a UE (e.g., UE 120). In some aspects, the UE may be deployed in a wireless network, such as wireless network 100.

In some aspects, the UE may be deployed in a C-V2X deployment or another type of deployment in which the UE communicates with other UEs on a sidelink. In this case, the UE may include a processor (e.g., a controller/processor 280) and a memory (e.g., memory 282) which may store and execute a safety application. The processor may generate basic safety messages for the safety application and may provide the basic safety messages to a modem of the UE.

The modem of the UE may be implemented by a receive processor (e.g., receive processor 258), a transmit processor (e.g., transmit processor 264), a controller/processor (e.g., controller/processor 280), a memory (e.g., memory 282), a modem component that includes one or more of a receive processor, a transmit processor, a controller/processor, a memory, an integrated circuit, an ASIC, and/or the like. The modem may be capable of packetizing the basic safety messages, encoding packets, modulating the encoded packets, and/or performing other baseband processing of the basic safety messages for transmission on the sidelink.

In some aspects, the processor executing the safety application may generate basic safety messages based at least in part on a basic safety message generation periodicity, which may be adjusted using one or more of the techniques described above in connection with FIGS. 3A and 3B. For example, the processor may generate a basic safety message at an interval that occurs based at least in part on the basic safety message generation periodicity. The modem may reserve or schedule SPS resources on the sidelink for transmission of the basic safety messages. In some aspects, the modem may reserve or schedule the SPS resources such that the SPS resources occur based at least in part on an SPS periodicity, where each SPS resource occurs at an interval that is based at least in part on the SPS periodicity.

As shown in FIG. 5, and by reference number 502, to transmit basic safety messages, the processor executing the safety application may provide an SPS resource request to the modem to reserve, configure, or schedule SPS resources at an SPS periodicity. The modem may receive the request, and may reserve, configure, or schedule the SPS resources based at least in part on the SPS periodicity.

As further shown in FIG. 5, and by reference numbers 504-514, the modem may provide the processor with an indication of respective transmit times for each basic safety message that is to be generated by the processor. In some aspects, the transmit times may be based at least in part on the SPS periodicity, based at least in part on a basic safety message generation periodicity, and/or the like. The processor may generate a basic safety message for each provided transmit time and based at least in part on an offset.

As shown by reference number 504, the modem may provide the processor with an indication of a first time (indicated in FIG. 5 as t0) that is based at least in part on the SPS periodicity. The first transmit time may be a time at which a first basic safety message after the SPS resource reservation is configured or scheduled to be transmitted in a first SPS resource. As shown by reference number 506, processor may generate the first basic safety message based at least in part on the offset relative to the first transmit time (e.g., at time t0−the offset) and may provide the first basic safety message to the modem for transmission at t0.

As shown by reference number 504, the modem may provide the processor with an indication of a first time (indicated in FIG. 5 as t0) that is based at least in part on the SPS periodicity. The first transmit time may be a time at which a first basic safety message after the SPS resource reservation is configured or scheduled to be transmitted in a first SPS resource. As shown by reference number 506, the processor may generate the first basic safety message based at least in part on the offset relative to the first transmit time (e.g., at time t0−the offset) and may provide the first basic safety message to the modem for transmission at t0.

As shown by reference number 508, the modem may provide the processor with an indication of a second time (t0+one SPS period) that is based at least in part on the SPS periodicity. The second transmit time may be a time at which a second basic safety message at one SPS period after the SPS resource reservation is configured or scheduled to be transmitted in a second SPS resource. As shown by reference number 510, the processor may generate the second basic safety message based at least in part on the offset relative to the second transmit time (e.g., at time t0+one SPS period−the offset) and may provide the second basic safety message to the modem for transmission at t0+one SPS period.

As shown by reference number 512, the modem may provide the processor with an indication of a third time (t0+two SPS periods) that is based at least in part on the SPS periodicity. The third transmit time may be a time at which a third basic safety message at two SPS periods after the SPS resource reservation is configured or scheduled to be transmitted in a third SPS resource. As shown by reference number 514, the processor may generate the third basic safety message based at least in part on the offset relative to the third transmit time (e.g., at time t0+two SPS periods−the offset) and may provide the third basic safety message to the modem for transmission at t0+two SPS periods. The processor may generate subsequent basic safety messages based at least in part on the offset and transmit times in a similar manner as described above.

In this way, the modem of the UE may provide the processor with respective transmit times, each of which may indicate a time, based at least in part on an SPS periodicity, at which a basic safety message is to be transmitted in an SPS resource. In this way, the processor may generate a basic safety message at an offset from the transmit times in a manner that reduces the amount of time between generation and transmission of the basic safety message. This reduces the information age of the information included in the basic safety message, which prevents or reduces the likelihood that the information will become stale, out-of-date, or inaccurate.

As indicated above, FIG. 5 is provided as an example. Other examples may differ from what is described with respect to FIG. 5.

Figure 6A:
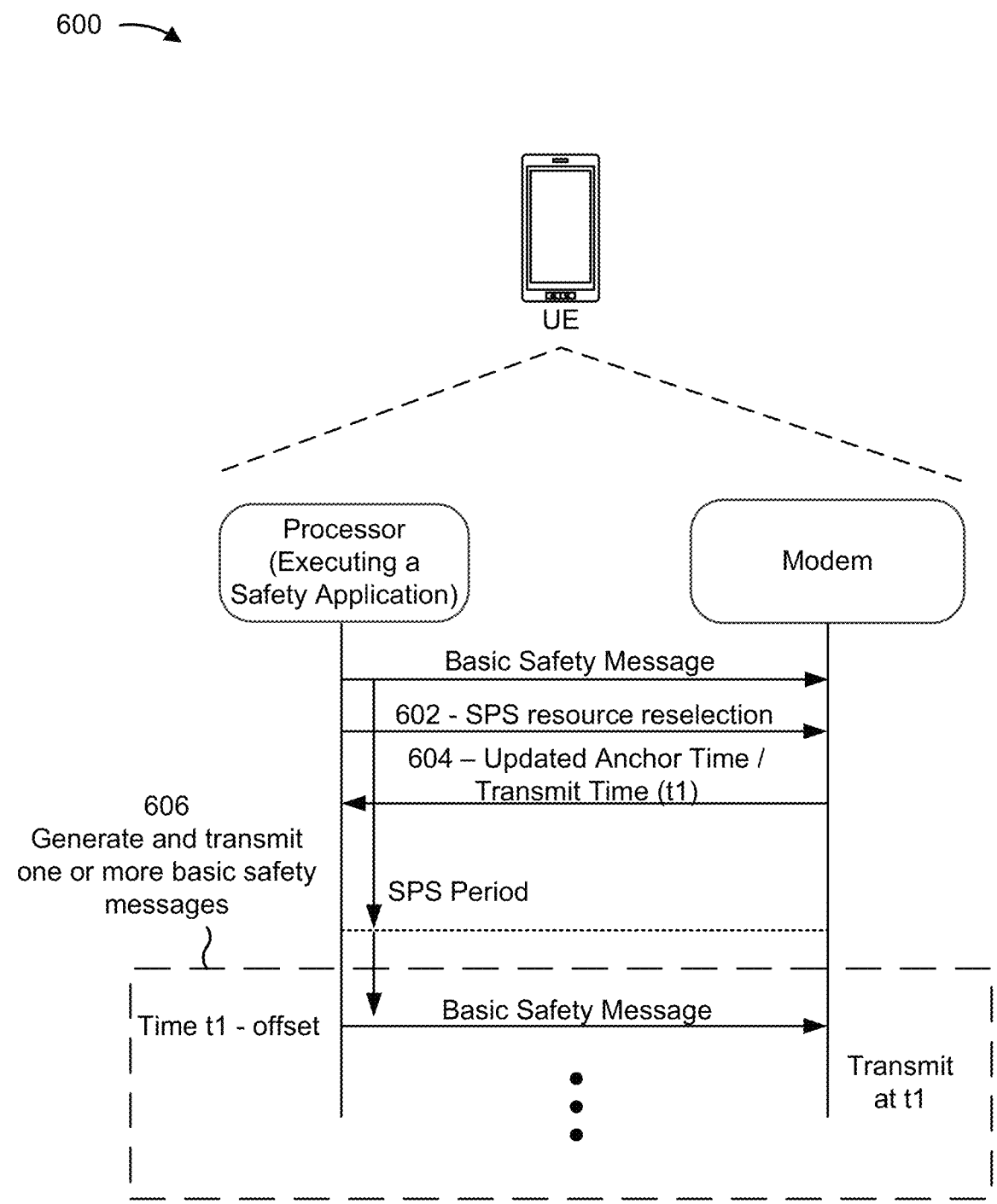
Figure 6B:
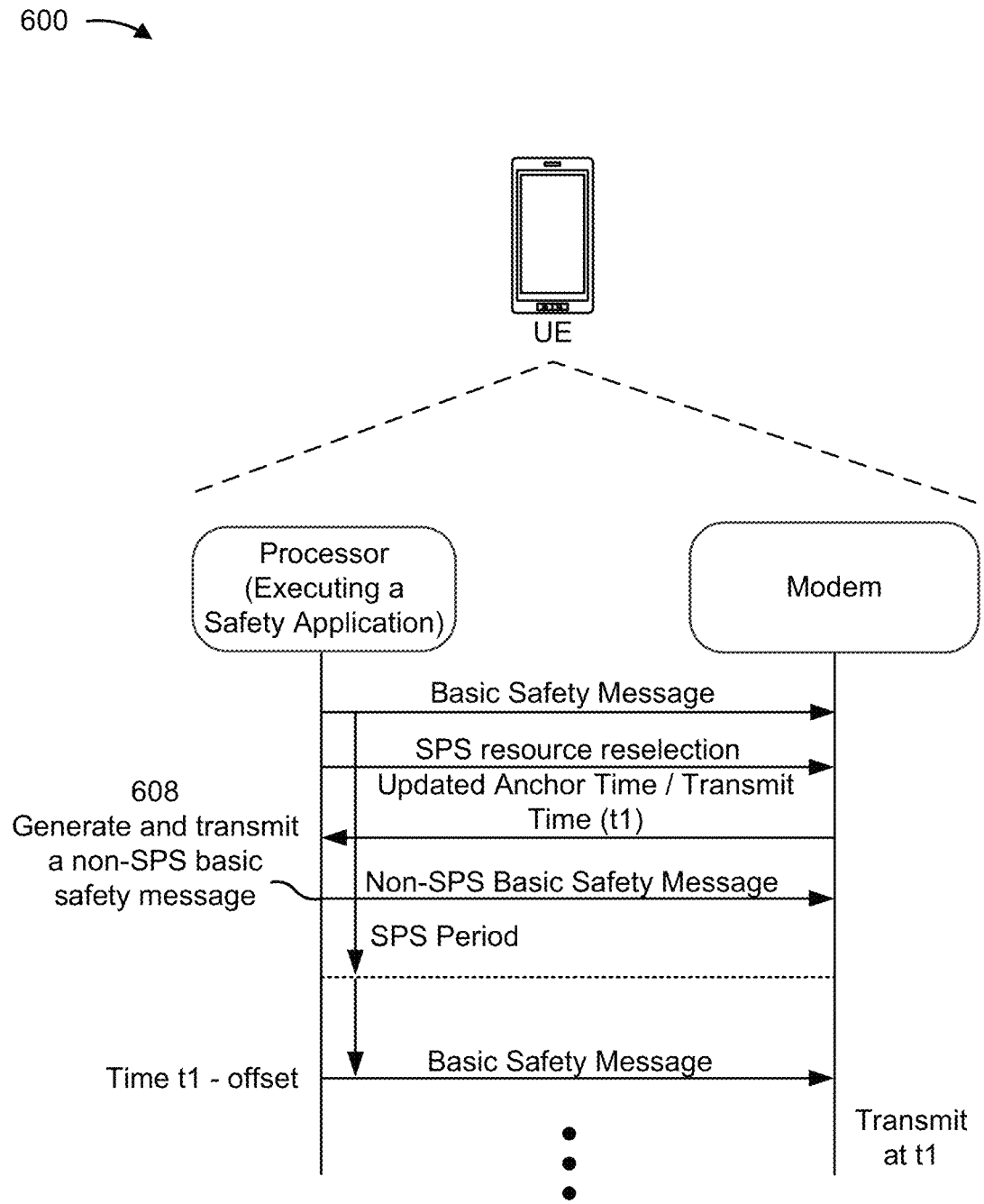
Figure 6C:
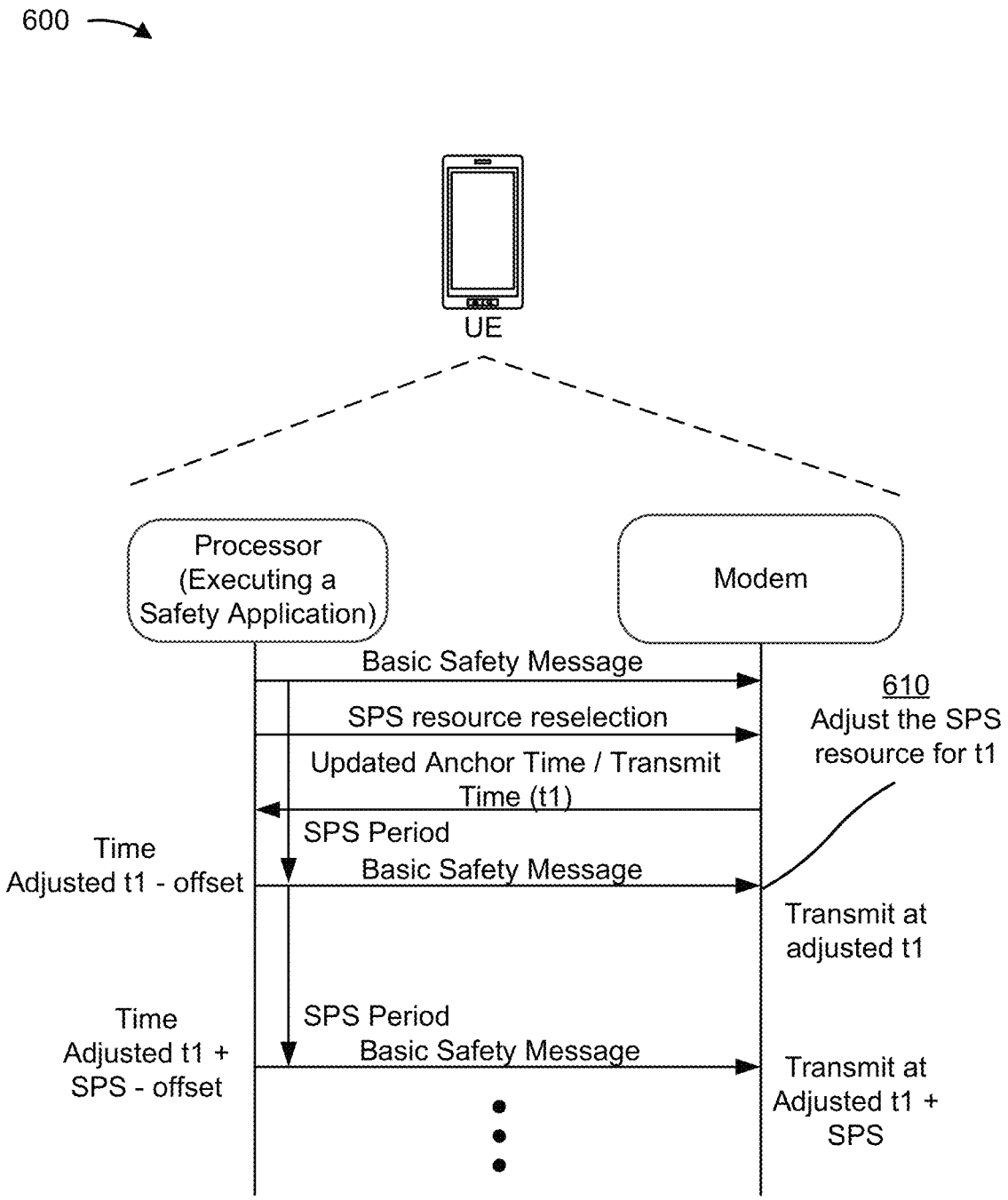

FIGS. 6A-6C are diagrams illustrating an example 600 of reducing semi-persistent scheduling latency, in accordance with the present disclosure. As shown in FIGS. 6A-6C, example 600 may include a UE (e.g., UE 120). In some aspects, the UE may be deployed in a wireless network, such as wireless network 100.

In some aspects, the UE may be deployed in a C-V2X deployment or another type of deployment in which the UE communicates with other UEs on a sidelink. In this case, the UE may include a processor (e.g., a controller/processor 280) and a memory (e.g., memory 282) which may store and execute a safety application. The processor may generate basic safety messages for the safety application and may provide the basic safety messages to a modem of the UE.

The modem of the UE may be implemented by a receive processor (e.g., receive processor 258), a transmit processor (e.g., transmit processor 264), a controller/processor (e.g., controller/processor 280), a memory (e.g., memory 282), a modem component that includes one or more of a receive processor, a transmit processor, a controller/processor, a memory, an integrated circuit, an ASIC, and/or the like. The modem may be capable of packetizing the basic safety messages, encoding packets, modulating the encoded packets, and/or performing other baseband processing of the basic safety messages for transmission on the sidelink.

In some aspects, the processor executing the safety application may generate basic safety messages based at least in part on a basic safety message generation periodicity. For example, the processor may generate a basic safety message at an interval that occurs based at least in part on the basic safety message generation periodicity. The modem may reserve or schedule SPS resources on the sidelink for transmission of the basic safety messages. In some aspects, the modem may reserve or schedule the SPS resources such that the SPS resources occur based at least in part on an SPS periodicity, where each SPS resource occurs at an interval that is based at least in part on the SPS periodicity.

As further shown in FIG. 6A, and by reference number 602, in some cases, the processor executing the safety application may periodically provide the modem with an SPS resource reselection request. In some aspects, the processor may request an SPS resource reselection based at least in part on an increased frequency for transmitting basic safety messages specified by the safety application, based at least in part on network congestion on the sidelink, and/or the like.

The modem may receive the SPS resource reselection request and may perform the SPS resource reselection based at least in receiving the request. In this case, the modem may select an updated set of SPS resources for basic safety message transmission, and may select an updated anchor time or a new transmit time (indicated in FIG. 6A as t1) based at least in part on the SPS resource resection. As shown by reference number 604, the modem may provide the processor with an indication of the updated anchor time or transmit time.

As further shown in FIG. 6A, and by reference number 606, the UE may generate and transmit one or more basic safety messages based at least in part on the updated anchor time or transmit time. For example, the processor may generate a basic safety message at an offset time relative to the updated anchor time or transmit time (e.g., at time t1−the offset) and may provide the basic safety message to the modem for transmission at time t1.

As further shown in FIG. 6A, in some cases, the updated anchor time or transmit time selected by the modem may result in the basic safety message being transmitted at a time that does not satisfy the SPS periodicity. In other words, the time between the transmission of the most recent basic safety message and the transmission of the basic safety message based at time t1 may be greater than the SPS periodicity, which may result in an increased information age of the information included in the basic safety message.

In some aspects, the UE may be permitted to transmit the basic safety message at t1 even though the transmission of the basic safety message at t1 does not satisfy the SPS periodicity due to the low and/or infrequent occurrence of basic safety messages that do not satisfy the SPS periodicity.

As shown in FIG. 6B, and by reference number 608, in some aspects, the UE may be capable of mitigating a transmission of the basic safety message at time t1 that does not satisfy the SPS periodicity by transmitting a non-SPS basic safety message (which may also be referred to as a one-shot intermediate basic safety message) between the transmission of the most recent basic safety message and the transmission of the basic safety message at time t1. For example, the processor may determine that transmission of the basic safety message at time t1 will not satisfy the SPS periodicity, and may generate the non-SPS basic safety message to satisfy the SPS periodicity based at least in part on the determination. In this way, the non-SPS basic safety message may be transmitted within the SPS period from the transmission of the most recent basic safety message, which satisfies the SPS periodicity. Subsequent basic safety messages may be transmitted based at least in part on the SPS periodicity at time t1 and so on.

In some aspects, the modem may instruct the processor to generate the non-SPS basic safety message such that the non-SPS basic safety message is to be transmitted within a threshold range associated with transmission of the basic safety message at time t1. For example, the modem may instruct the processor to generate the non-SPS basic safety message such that the non-SPS basic safety message is to be transmitted within ±50 ms from t1. In another aspect, the modem may select resources within T1 to T2 from the time of decision to reselect, where T1 is generally about 4 ms, and T2 varies depending on the detected load on the channel and is always less than the delay budget which has been assumed to be 100 ms in the preceding description. Thus, by choosing the reselection time at t1−(T2−T1)/2−T1, the modem can ensure that the transmission time will be between +−(T2−T1)/2 from t1.

In some aspects, the use of the non-SPS basic safety message may still result in the transmission of the basic safety message at time t1 not satisfying the SPS periodicity. In other words, the time between transmission of the non-SPS basic safety message and the transmission of the basic safety message at time t1 may still exceed the SPS periodicity. In these examples, the processor may generate another non-SPS basic safety message based at least in part on the determination that the transmission of the non-SPS basic safety message will result in the amount of time between transmission of the non-SPS time and transmission of the basic safety message at time t1 to exceed the SPS periodicity. In some aspects, the processor may generate further non-SPS basic safety messages as needed to satisfy the SPS periodicity.

In some aspects, the modem may autonomously generate and transmit the non-SPS basic safety messages (e.g., without input from the processor) such that the process of transmitting the non-SPS basic safety messages is transparent to the processor.

As shown in FIG. 6C, and by reference number 610, in some aspects, the UE may be capable of mitigating the transmission of the basic safety message at time t1 that does not satisfy the SPS periodicity by adjusting the selection of the SPS resource for the basic safety message. In these examples, the modem may adjust the selection of the SPS resource such that time t1 occurs earlier in time and within the SPS period from the most recent basic safety message transmission such that the SPS periodicity is satisfied.

As further shown in FIG. 6C, subsequent basic safety messages may be generated and transmitted at SPS periods relative to the adjusted time t1. For example, the processor may generate a subsequent basic safety message at the offset value relative to the adjusted time t1+one SPS period, and may provide the subsequent basic safety message to the modem for transmission at adjusted time t1+one SPS period.

In this way, the processor and the modem of the UE may use one or more techniques described above to reduce information age and/or SPS scheduling latency, such as generating and transmitting non-SPS basic safety messages in scenarios in which an anchor time or transmit time is updated, scheduling an SPS resource within an SPS period in scenarios in which an anchor time or transmit time is updated, and/or the like.

As indicated above, FIGS. 6A-6C are provided as one or more examples. Other examples may differ from what is described with respect to FIGS. 6A-6C.

Figure 7:
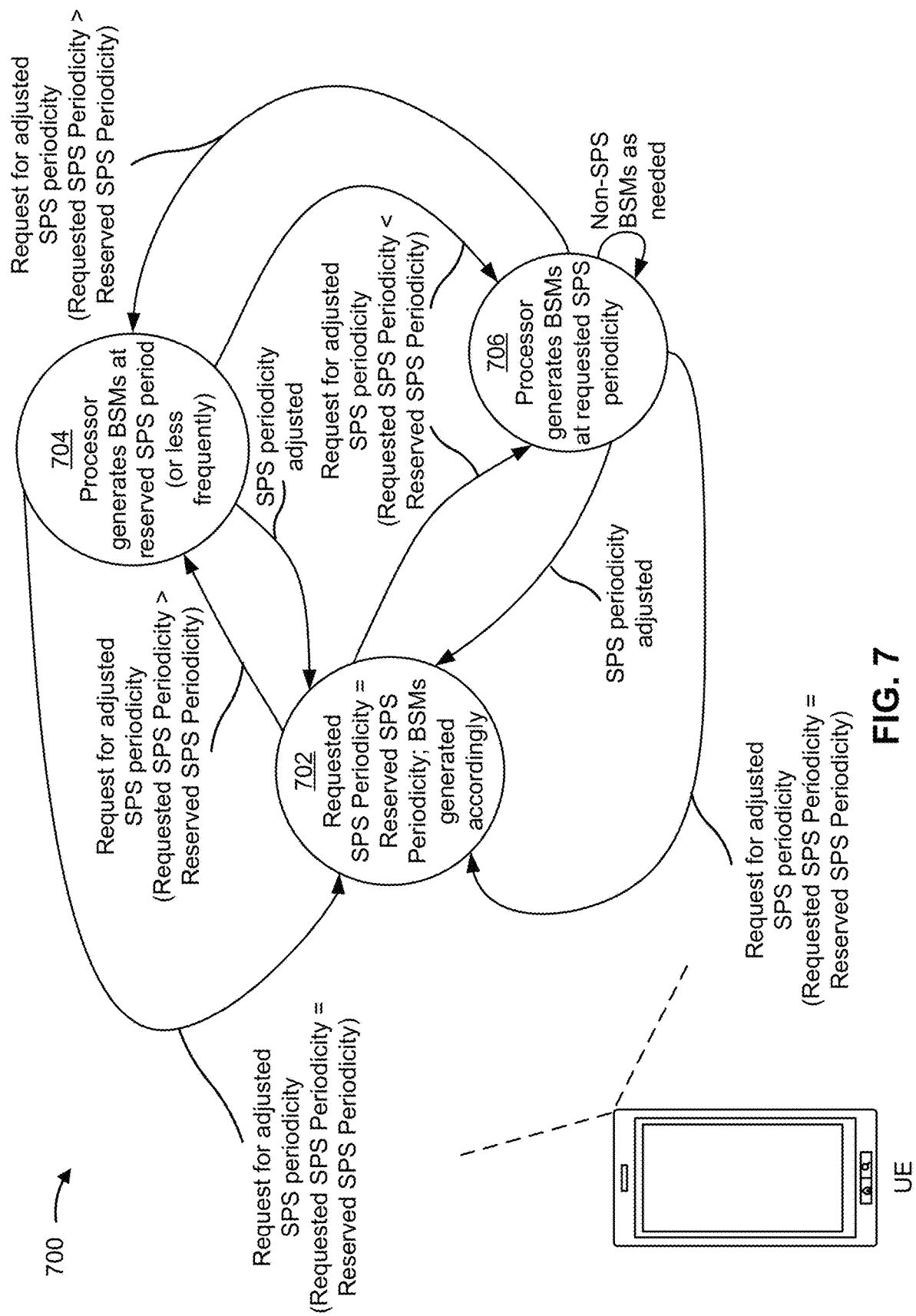
FIG. 7 is a diagram illustrating an example of adjusting an SPS periodicity, in accordance with the present disclosure.

FIG. 7 is a diagram illustrating an example 700 of reducing semi-persistent scheduling latency, in accordance with the present disclosure. As shown in FIG. 7, example 700 may include a UE (e.g., UE 120). In some aspects, the UE may be deployed in a wireless network, such as wireless network 100.

In some aspects, the UE may be deployed in a C-V2X deployment or another type of deployment in which the UE communicates with other UEs on a sidelink. In this case, the UE may include a processor (e.g., a controller/processor 280) and a memory (e.g., memory 282) which may store and execute a safety application. The processor may generate basic safety messages for the safety application and may provide the basic safety messages to a modem of the UE.

The modem of the UE may be implemented by a receive processor (e.g., receive processor 258), a transmit processor (e.g., transmit processor 264), a controller/processor (e.g., controller/processor 280), a memory (e.g., memory 282), a modem component that includes one or more of a receive processor, a transmit processor, a controller/processor, a memory, an integrated circuit, an ASIC, and/or the like. The modem may be capable of packetizing the basic safety messages, encoding packets, modulating the encoded packets, and/or performing other baseband processing of the basic safety messages for transmission on the sidelink.

In some aspects, the processor executing the safety application may generate basic safety messages based at least in part on a basic safety message generation periodicity, which may be adjusted using one or more of the techniques described above in connection with FIGS. 3A and 3B. For example, the processor may generate a basic safety message at an interval that occurs based at least in part on the basic safety message generation periodicity. The modem may reserve or schedule SPS resources on the sidelink for transmission of the basic safety messages. In some aspects, the modem may reserve or schedule the SPS resources such that the SPS resources occur based at least in part on an SPS periodicity, where each SPS resource occurs at an interval that is based at least in part on the SPS periodicity.

In some aspects, the modem and/or the processor may adjust the SPS periodicity (e.g., based at least in part on an expected change to the basic safety message generation periodicity for the safety application, based at least in part on sidelink and/or network congestion, and/or the like). For example, the processor may request an SPS periodicity that is greater than the reserved SPS periodicity for the safety application. As another example, the processor may request an SPS periodicity that is less than the reserved SPS periodicity for the safety application. The modem may receive the request to adjust the SPS periodicity and may adjust the SPS periodicity at the next reselection opportunity, which may occur at particular times or at particular intervals in the wireless network. Example 700 of FIG. 7 may illustrate various operating states and state transitions for adjusting an SPS periodicity.

As shown in FIG. 7, state 702 corresponds to a state of the UE where the SPS periodicity reserved by the modem is set to or equal to SPS periodicity requested by the processor executing the safety application. In state 702, processor may generate basic safety messages according to the reserved SPS periodicity.

As further shown in FIG. 7, state 704 corresponds to a state of the UE where the SPS periodicity requested by the processor is greater than the SPS periodicity reserved by the modem. In some aspects, the UE may transition to state 704 from state 702 or state 706 based at least in part on the processor providing the modem with a request for an adjusted SPS periodicity that is greater than the SPS periodicity reserved by the modem.

In state 704, the processor may generate basic safety messages at the reserved SPS periodicity or less frequently until the modem provides the processor with an indication that the reserved SPS periodicity has been adjusted to match the requested SPS periodicity (in which case the UE may transition to state 702), until the processor provides the modem with a request for an adjusted SPS periodicity that matches the reserved SPS periodicity (in which case the UE may transition to state 702), or until the processor provides the modem with a request for an adjusted SPS periodicity that is less than the reserved SPS periodicity (in which case the UE may transition to state 702). In some aspects, when adjusting the reserved SPS periodicity to a greater periodicity, the modem may change the selection at a time of arrival of the latest basic safety message arrival to avoid out of phase transmissions.

As further shown in FIG. 7, state 706 corresponds to a state of the UE where the SPS periodicity requested by the processor is less than the SPS periodicity reserved by the modem. In some aspects, the UE may transition to state 706 from state 702 or state 704 based at least in part on the processor providing the modem with a request for an adjusted SPS periodicity that is less than the SPS periodicity reserved by the modem.

In state 706, the processor may generate basic safety messages at the requested SPS periodicity until the modem provides the processor with an indication that the reserved SPS periodicity has been adjusted to match the requested SPS periodicity (in which case the UE may transition to state 702), until the processor provides the modem with a request for an adjusted SPS periodicity that matches the reserved SPS periodicity (in which case the UE may transition to state 702), or until the processor provides the modem with a request for an adjusted SPS periodicity that is greater than the reserved SPS periodicity (in which case the UE may transition to state 704).

Moreover, while the UE is in state 706, the modem may transmit non-SPS basic safety messages as needed in order for the UE to transmit basic safety messages at the requested SPS periodicity. In these examples, the modem may generate and transmit the non-SPS basic safety messages without input from the processor.

In this way, the processor and the modem of the UE may adjust the SPS periodicity for transmitting basic safety messages, may adjust the generation of basic safety messages to accommodate the SPS periodicity adjustments, and/or the like.

As indicated above, FIG. 7 is provided as an example. Other examples may differ from what is described with respect to FIG. 7.

For example, in some aspects, the processor may always reserve the SPS flow periodicity and generate packets using the same periodicity value. The periodicity may be determined and updated by the processor using a congestion control algorithm (e.g., a society of automotive engineers (SAE) specified congestion control algorithm and/or another type of congestion control algorithm). However, on a request to change the flow periodicity, the modem may delay the change in the SPS reservation and may maintain the reservation until the next reselection. Until the next reselection, there will be a mismatch between the actual safety message generation periodicity at the safety application, and the actual SPS periodicity reserved for transmission. Until the modem SPS reservation is updated to match the requested SPS reservation (which is equal to the safety application message generation periodicity), any packet received for transmission that does not arrive within the delay budget from the net transmission opportunity is sent as non-SPS or single shot transmission.

In some aspects, as a variant of the above alternative, the modem may determine to delay the periodicity change until the next reservation if the periodicity is decreased, but change the reservation immediately or after a shorted delay if the periodicity is decreased.

Figure 8:
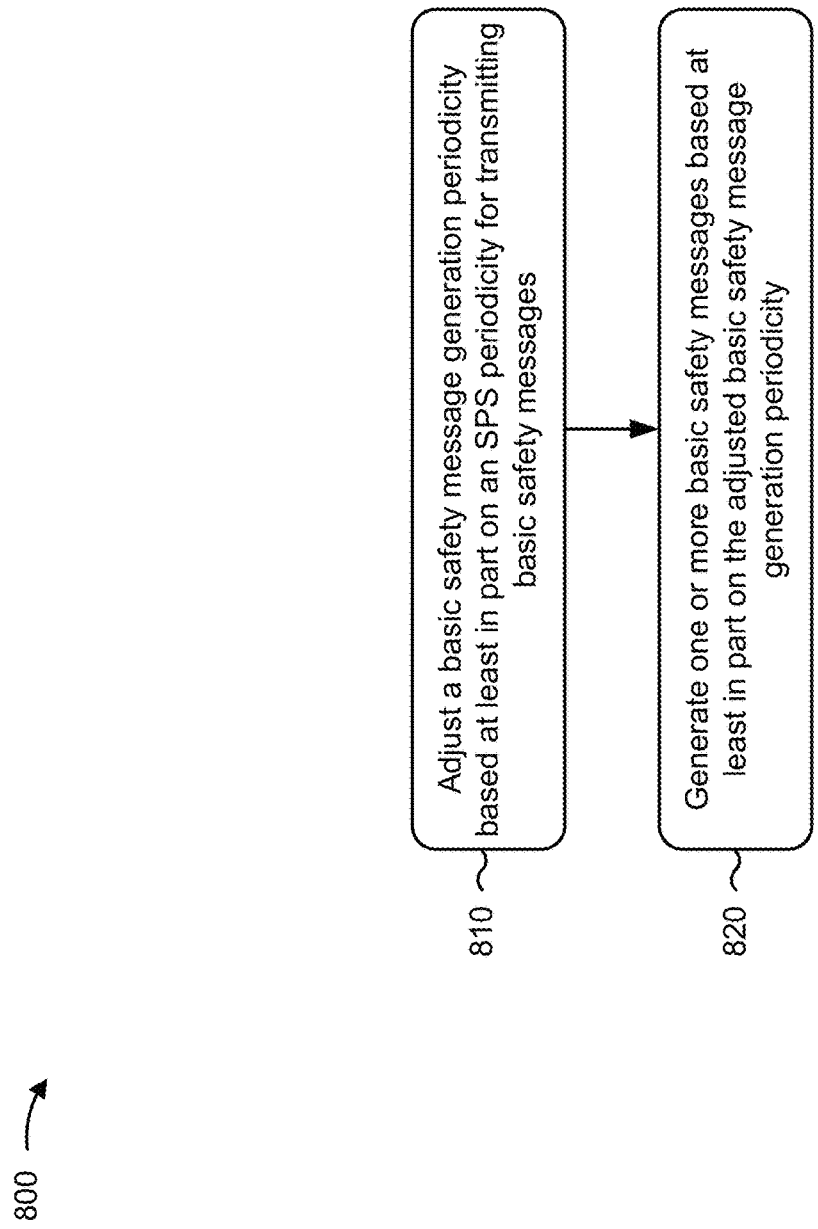
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120 illustrated and described in connection with FIGS. 1 and 2, the UE illustrated and described in connection with FIGS. 3A, 3B, 4, 5, 6A-6C, and/or 7) performs operations associated with reducing semi-persistent scheduling latency.

As shown in FIG. 8, in some aspects, process 800 may include adjusting a basic safety message generation periodicity based at least in part on an SPS periodicity for transmitting basic safety messages (block 810). For example, the UE (e.g., using receive processor 258, transmit processor 264, controller/processor 280, memory 282, and/or the like) may adjust a basic safety message generation periodicity based at least in part on an SPS periodicity for transmitting basic safety messages, as described above.

As further shown in FIG. 8, in some aspects, process 800 may include generating one or more basic safety messages based at least in part on the adjusted basic safety message generation periodicity (block 820). For example, the UE (e.g., using receive processor 258, transmit processor 264, controller/processor 280, memory 282, and/or the like) may generate one or more basic safety messages based at least in part on the adjusted basic safety message generation periodicity, as described above.

Process 800 may include additional aspects, such as any single aspect or any combination of aspects described below and/or in connection with one or more other processes described elsewhere herein.

In a first aspect, adjusting the basic safety message generation periodicity comprises rounding the basic safety message generation periodicity up or down to a multiple of a 100 millisecond periodicity. In a second aspect, alone or in combination with the first aspect, adjusting the basic safety message generation periodicity comprises rounding the basic safety message generation periodicity up or down to a multiple of the SPS periodicity. In a third aspect, alone or in combination with one or more of the first and second aspects, adjusting the basic safety message generation periodicity comprises rounding the basic safety message generation periodicity up or down to a nearest periodicity that is permitted by a specification.

In a fourth aspect, alone or in combination with one or more of the first through third aspects, process 800 includes receiving, from a modem of the UE and at a processor of the UE executing a safety application, an indication of an anchor time that is based at least in part on a resource selection for the safety application, and generating the one or more basic safety messages comprises generating, using the processor, a basic safety message of the one or more basic safety messages at an offset time prior to the anchor time and providing the basic safety message to the modem. In a fifth aspect, alone or in combination with one or more of the first through fourth aspects, process 800 includes generating, using the processor, another basic safety message of the one or more basic safety messages at the offset time prior to one or more periods of the SPS periodicity from the anchor time; and providing the other basic safety message to the modem.

In a sixth aspect, alone or in combination with one or more of the first through fifth aspects, process 800 includes receiving, at a modem of the UE, an indication of a resource reselection associated with a safety application that is associated with the one or more basic safety messages; determining, using the modem, an updated anchor time based at least in part on the resource reselection; and providing, from the modem and to a processor of the UE executing the safety application, an indication of the updated anchor time. In a seventh aspect, alone or in combination with one or more of the first through sixth aspects, generating the one or more basic safety messages comprises generating, using the processor, a basic safety message of the one or more basic safety messages at an offset time prior to the updated anchor time, where an amount of time between a time at which the basic safety message is to be transmitted and a time at which another basic safety message most recently generated by the UE is to be transmitted exceeds the SPS periodicity.

In an eighth aspect, alone or in combination with one or more of the first through seventh aspects, process 800 includes determining, using the processor, that transmission of a first basic safety message of the one or more basic safety messages at the updated anchor time will result in an amount of time between the updated anchor time and a time at which a second basic safety message most recently generated by the UE is to be transmitted exceeds the SPS periodicity; and generating, using the processor, a non-SPS basic safety message based at least in part on the determination that the transmission of the first basic safety message at the updated anchor time will result in the amount of time between the updated anchor time and the time at which the second basic safety message most recently generated by the UE is to be transmitted exceeds the SPS periodicity, wherein the non-SPS basic safety message is generated after generation of the first basic safety message and prior to generation of the second basic safety message.

In a ninth aspect, alone or in combination with one or more of the first through eighth aspects, process 800 includes determining, using the modem, that transmission of a first basic safety message of the one or more basic safety messages at the updated anchor time will result in an amount of time between the updated anchor time and a time at which a second basic safety message most recently generated by the UE is to be transmitted exceeds the SPS periodicity; and selecting, using the modem, a resource prior to the updated anchor time for transmission of the first basic safety message based at least in part on the determination that the transmission of the first basic safety message at the updated anchor time will result in the amount of time between the updated anchor time and the time at which the second basic safety message most recently generated by the UE is to be transmitted exceeds the SPS periodicity, wherein transmission of the first basic safety message in the selected resource is to satisfy the SPS periodicity.

In a tenth aspect, alone or in combination with one or more of the first through ninth aspects, process 800 includes receiving, from a modem of the UE and at a processor of the UE executing a safety application, an indication of respective transmit times for each of the one or more basic safety messages, and generating the one or more basic safety messages comprises generating, using the processor, the one or more basic safety messages at an offset time prior to the respective transmit times. In an eleventh aspect, alone or in combination with one or more of the first through tenth aspects, process 800 includes receiving, from the modem and at the processor, an indication of a non-SPS transmit time for transmission of a non-SPS basic safety message transmission between a first basic safety message of the one or more basic safety messages and a second basic safety message of the one or more basic safety messages; and generating, using the processor, the non-SPS basic safety message at the offset time prior to the non-SPS transmit time.

In a twelfth aspect, alone or in combination with one or more of the first through eleventh aspects, an amount of time between the non-SPS transmit time and a transmit time at which the second basic safety message is to be transmitted exceeds the SPS periodicity. In a thirteenth aspect, alone or in combination with one or more of the first through twelfth aspects, process 800 includes determining, using the modem, that transmission of a message at a non-SPS transmission due to a muting event for a SPS flow is needed; determining an optimal resource selection time for the non-SPS transmission based at least in part on a minimum scheduling delay T1 and a maximum scheduling delay T2, wherein T2 is based at least in part on a current load on the processor, and wherein the optimal resource selection time minimizes the maximum amount of time between successive transmission; and selecting a resource for the non-SPS transmission at the optimal resource selection time.

In a fourteenth aspect, alone or in combination with one or more of the first through thirteenth aspects, process 800 includes determining, using the processor, that transmission of the non-SPS basic safety message at the non-SPS transmit time will result in an amount of time between the non-SPS time and a transmit time at which the second basic safety message is to be transmitted exceeds the SPS periodicity; and generating, using the processor, another non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the other non-SPS basic safety message is generated after generation of the non-SPS basic safety message and prior to generation of the second basic safety message.

In a fifteenth aspect, alone or in combination with one or more of the first through fourteenth aspects, process 800 includes determining, using the processor, that transmission of the non-SPS basic safety message at the non-SPS transmit time will result in an amount of time between the non-SPS time and a transmit time at which the second basic safety message is to be transmitted exceeds the SPS periodicity; and selecting, using the modem, a resource prior to the non-SPS transmit time for transmission of the non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein transmission of the non-SPS basic safety message in the selected resource is to satisfy the SPS periodicity.

In a sixteenth aspect, alone or in combination with one or more of the first through fifteenth aspects, process 800 includes determining, using the processor, that transmission of the non-SPS basic safety message at the non-SPS transmit time will result in an amount of time between the non-SPS time and a transmit time at which the second basic safety message is to be transmitted exceeds the SPS periodicity; and selecting, using the modem, the non-SPS transmit time based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the non-SPS transmit time is within a threshold time range associated with the transmit time at which the second basic safety message is to be transmitted.

In a seventeenth aspect, alone or in combination with one or more of the first through sixteenth aspects, process 800 includes providing, using a processor of the UE executing a safety application and to a modem of the UE, a request for an adjusted SPS periodicity; configuring, using the modem, the adjusted SPS periodicity at a reselection opportunity; and receiving, using the processor, an indication of an anchor time for transmission of the one or more basic safety messages that is based at least in part on the adjusted SPS periodicity. In an eighteenth aspect, alone or in combination with one or more of the first through seventeenth aspects, the adjusted SPS periodicity is higher relative to the SPS periodicity, and generating the one or more basic safety messages comprises generating the one or more basic safety messages based at least in part on the SPS periodicity prior to the processor receiving the adjusted SPS periodicity.

In a nineteenth aspect, alone or in combination with one or more of the first through eighteenth aspects, the adjusted SPS periodicity is lower relative to the SPS periodicity, and process 800 includes generating, using the processor or the modem, one or more non-SPS basic safety messages at a frequency that is greater relative to the SPS periodicity prior to the processor receiving the adjusted SPS periodicity. In a twentieth aspect, alone or in combination with one or more of the first through nineteenth aspects, process 800 includes providing, using the processor and to the modem, a request for another adjusted SPS periodicity prior to receiving the indication of the anchor time.

In a twenty-first aspect, alone or in combination with one or more of the first through twentieth aspects, the reselection opportunity is based at least in part on a time of arrival of a most recent basic safety message of the one or more basic safety messages at the modem. In a twenty-second aspect, alone or in combination with one or more of the first through twenty-first aspects, process 800 includes providing, using a processor of the UE executing a safety application and to a modem of the UE, a request for an adjusted SPS periodicity; configuring, using the modem, the adjusted SPS periodicity at a reselection opportunity; and until the reselection opportunity, transmit any packets that do not fit into a reserved SPS transmission into non-SPS transmissions.

In a twenty-third aspect, alone or in combination with one or more of the first through twenty-second aspects, the safety application generates basic safety messages at the latest adjusted SPS periodicity at all times. In a twenty-fourth aspect, alone or in combination with one or more of the first through twenty-third aspects, the reselection opportunity is based at least in part on a time of arrival of a most recent basic safety message of the one or more basic safety messages at the modem.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
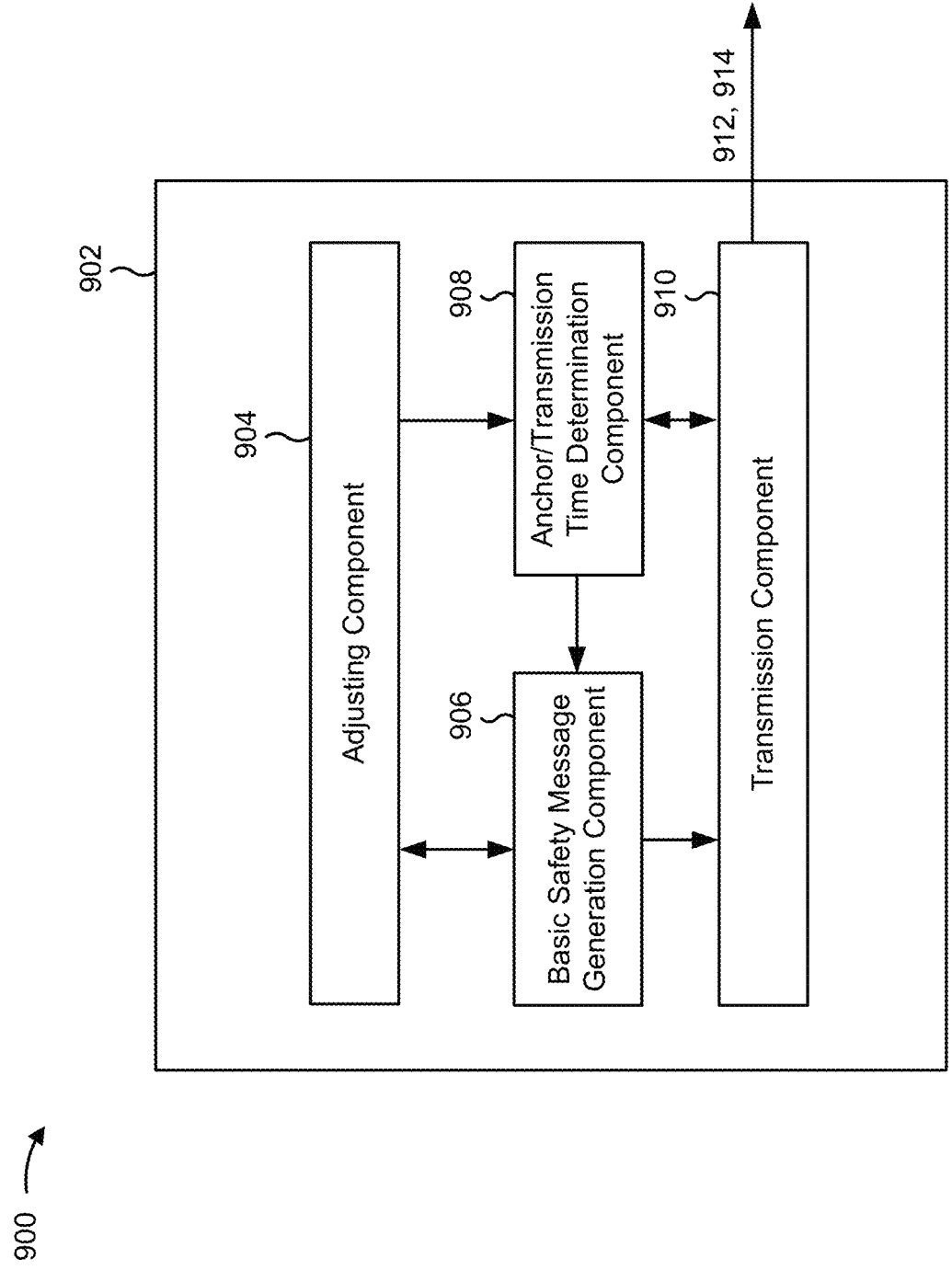
FIG. 9 is a conceptual data flow diagram illustrating a data flow between different components in an example apparatus, in accordance with the present disclosure.

FIG. 9 is a conceptual data flow diagram 900 illustrating a data flow between different components in an example apparatus 902. The apparatus 902 may be a UE (e.g., UE 120 illustrated and described in connection with FIGS. 1 and 2, the UE illustrated and described in connection with FIGS. 3A, 3B, 4, 5, 6A-6C, and/or 7). In some aspects, the apparatus 902 includes an adjusting component 904, a basic safety message generation component 906, an anchor/transmission time determination component 908, and a transmission component 910.

In some aspects, the adjusting component 904 may adjust a basic safety message generation periodicity based at least in part on an SPS periodicity for transmitting basic safety messages 912. In some aspects, basic safety message generation component 906 may generate one or more basic safety messages 912 based at least in part on the adjusted basic safety message generation periodicity adjusted by adjusting component 904. In some aspects, basic safety message generation component 906 may provide the one or more basic safety messages 912 to transmission component 910, and transmission component 910 may transmit the one or more basic safety messages 912.

In some aspects, anchor/transmission time determination component 908 may determine an anchor time and may provide an indication of the anchor time to basic safety message generation component 906. In some aspects, the anchor time may be based at least in part on a resource selection for a safety application associated with the apparatus 902. In some aspects, basic safety message generation component 906 may receive an indication of the anchor time and may generate a basic safety message 912 at an offset time prior to the anchor time.

In some aspects, anchor/transmission time determination component 908 may receive an indication of a resource reselection associated with the safety application that is associated with the one or more basic safety messages 912, may determine an updated anchor time based at least in part on the resource reselection, and may provide an indication of the updated anchor time to basic safety message generation component 906. In some aspects, basic safety message generation component 906 may generate a basic safety message of the one or more basic safety messages at an offset time prior to the updated anchor time. In some aspects, basic safety message generation component 906 may generate a non-SPS basic safety message 914 based at least in part on the determination that the transmission of a basic safety message 912 at the updated anchor time will result in the amount of time between the updated anchor time and the time at which the basic safety message 912 most recently generated by the basic safety message generation component 906 is to be transmitted exceeds the SPS periodicity.

In some aspects, transmission component 910 may transmit a resource prior to the updated anchor time for transmission of a basic safety message 912 based at least in part on the determination that the transmission of the basic safety message 912 at the updated anchor time will result in the amount of time between the updated anchor time and the time at which the a basic safety message 912 most recently generated by the basic safety message generation component 906 is to be transmitted exceeds the SPS periodicity.

In some aspects, anchor/transmission time determination component 908 may determine respective transmit times for each of the one or more basic safety messages 912, and may provide an indication of the respective transmit times to the basic safety message generation component 906. In some aspects, the basic safety message generation component 906 may generate the one or more basic safety messages 912 at an offset time prior to the respective transmit times.

In some aspects, the basic safety message generation component 906 may provide, to the adjusting component 904, a request for an adjusted SPS periodicity. The adjusting component 904 may receive the request, may configure the adjusted SPS periodicity at a reselection opportunity, and may provide an indication of an anchor time to the basic safety message generation component 906 for transmission of the one or more basic safety messages 912 that is based at least in part on the adjusted SPS periodicity. In some aspects, the basic safety message generation component 906 may generate the one or more basic safety messages 912 based at least in part on the SPS periodicity prior to the basic safety message generation component 906 receiving the adjusted SPS periodicity.

In some aspects, the adjusting component 904 may include a receive processor (e.g., receive processor 258), a transmit processor (e.g., transmit processor 264), a controller/processor (e.g., controller processor 280), a memory (e.g., memory 282), a modem of the apparatus 902 (e.g., implemented by one or more of the receive processor, the transmit processor, the controller/processor, and/or the memory), and/or the like. In some aspects, the basic safety message generation component 906 may include a receive processor (e.g., receive processor 258), a transmit processor (e.g., transmit processor 264), a controller/processor (e.g., controller processor 280), a memory (e.g., memory 282), a modem of the apparatus 902 (e.g., implemented by one or more of the receive processor, the transmit processor, the controller/processor, and/or the memory), and/or the like. In some aspects, the anchor/transmission time determination component 908 may include a receive processor (e.g., receive processor 258), a transmit processor (e.g., transmit processor 264), a controller/processor (e.g., controller processor 280), a memory (e.g., memory 282), a modem of the apparatus 902 (e.g., implemented by one or more of the receive processor, the transmit processor, the controller/processor, and/or the memory), and/or the like. In some aspects, the transmission component 910 may include a transmit processor (e.g., transmit processor 264), a controller/processor (e.g., controller processor 280), a memory (e.g., memory 282), a modem of the apparatus 902 (e.g., implemented by one or more of the receive processor, the transmit processor, the controller/processor, and/or the memory), and/or the like.

The apparatus 902 may include additional components that perform each of the blocks of the algorithm in the aforementioned process 800 of FIG. 8 and/or the like. Each block in the aforementioned process 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: adjusting a basic safety message generation periodicity based at least in part on a semi-persistent scheduling (SPS) periodicity for transmitting basic safety messages; and generating one or more basic safety messages based at least in part on the adjusted basic safety message generation periodicity.

Aspect 2: The method of Aspect 1, wherein adjusting the basic safety message generation periodicity comprises: rounding the basic safety message generation periodicity up or down to a multiple of a 100 millisecond periodicity. Aspect 3: The method of Aspect 1, wherein adjusting the basic safety message generation periodicity comprises: rounding the basic safety message generation periodicity up or down to a multiple of the SPS periodicity. Aspect 4: The method of Aspect 1, wherein adjusting the basic safety message generation periodicity comprises: rounding the basic safety message generation periodicity up or down to a nearest periodicity that is permitted by a specification.

Aspect 5: The method of any of Aspects 1-4, further comprising: receiving, from a modem of the UE and at a processor of the UE executing a safety application, an indication of an anchor time that is based at least in part on a resource selection for the safety application; and wherein generating the one or more basic safety messages comprises: generating, using the processor, a basic safety message of the one or more basic safety messages at an offset time prior to the anchor time; and providing the basic safety message to the modem. wherein generating the one or more basic safety messages comprises: generating, using the processor, a basic safety message of the one or more basic safety messages at an offset time prior to the anchor time; and providing the basic safety message to the modem. Aspect 6: The method of Aspect 5, wherein generating the one or more basic safety messages comprises: generating, using the processor, another basic safety message of the one or more basic safety messages at the offset time prior to one or more periods of the SPS periodicity from the anchor time; and providing the other basic safety message to the modem.

Aspect 7: The method of any of Aspects 1-6, further comprising: receiving, at a modem of the UE, an indication of a resource reselection associated with a safety application that is associated with the one or more basic safety messages; determining, using the modem, an updated anchor time based at least in part on the resource reselection; and providing, from the modem and to a processor of the UE executing the safety application, an indication of the updated anchor time. Aspect 8: The method of Aspect 7, wherein generating the one or more basic safety messages comprises: generating, using the processor, a basic safety message of the one or more basic safety messages at an offset time prior to the updated anchor time, wherein an amount of time between a time at which the basic safety message is to be transmitted and a time at which another basic safety message most recently generated by the UE is to be transmitted exceeds the SPS periodicity.

Aspect 9: The method of Aspect 7 or 8, further comprising: determining, using the processor, that transmission of a first basic safety message of the one or more basic safety messages at the updated anchor time will result in an amount of time between the updated anchor time and a time at which a second basic safety message most recently generated by the UE is to be transmitted exceeds the SPS periodicity; and generating, using the processor, a non-SPS basic safety message based at least in part on the determination that the transmission of the first basic safety message at the updated anchor time will result in the amount of time between the updated anchor time and the time at which the second basic safety message most recently generated by the UE is to be transmitted exceeds the SPS periodicity, wherein the non-SPS basic safety message is generated after generation of the first basic safety message and prior to generation of the second basic safety message. Aspect 10: The method of Aspect 7 or 8, further comprising: determining, using the modem, that transmission of a first basic safety message of the one or more basic safety messages at the updated anchor time will result in an amount of time between the updated anchor time and a time at which a second basic safety message most recently generated by the UE is to be transmitted exceeds the SPS periodicity; and selecting, using the modem, a resource prior to the updated anchor time for transmission of the first basic safety message based at least in part on the determination that the transmission of the first basic safety message at the updated anchor time will result in the amount of time between the updated anchor time and the time at which the second basic safety message most recently generated by the UE is to be transmitted exceeds the SPS periodicity, wherein transmission of the first basic safety message in the selected resource is to satisfy the SPS periodicity.

Aspect 11: The method of any of Aspects 1-11, further comprising: receiving, from a modem of the UE and at a processor of the UE executing a safety application, an indication of respective transmit times for each of the one or more basic safety messages, wherein the respective transmit times are based at least in part on a resource selection for the safety application and the SPS periodicity; and wherein generating the one or more basic safety messages comprises: generating, using the processor, the one or more basic safety messages at an offset time prior to the respective transmit times. wherein generating the one or more basic safety messages comprises: generating, using the processor, the one or more basic safety messages at an offset time prior to the respective transmit times.

Aspect 12: The method of Aspect 11, further comprising: receiving, from the modem and at the processor, an indication of a non-SPS transmit time for transmission of a non-SPS basic safety message transmission between a first basic safety message of the one or more basic safety messages and a second basic safety message of the one or more basic safety messages; and generating, using the processor, the non-SPS basic safety message at the offset time prior to the non-SPS transmit time. Aspect 13: The method of Aspect 12, wherein an amount of time between the non-SPS transmit time and a transmit time at which the second basic safety message is to be transmitted exceeds the SPS periodicity.

Aspect 14: The method of Aspect 12 or 13, further comprising: determining, using the modem, that transmission of a message at a non-SPS transmission due to a muting event for an SPS flow is needed; determining an optimal resource selection time for the non-SPS transmission based at least in part on a minimum scheduling delay T1 and a maximum scheduling delay T2, wherein T2 is based at least in part on a current load on the processor, and wherein the optimal resource selection time minimizes the maximum amount of time between successive transmission; and selecting a resource for the non-SPS transmission at the optimal resource selection time. Aspect 15: The method of Aspect 12 13, further comprising: determining, using the processor, that transmission of the non-SPS basic safety message at the non-SPS transmit time will result in an amount of time between the non-SPS time and a transmit time at which the second basic safety message is to be transmitted exceeds the SPS periodicity; and generating, using the processor, another non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the other non-SPS basic safety message is generated after generation of the non-SPS basic safety message and prior to generation of the second basic safety message.

Aspect 16: The method of Aspect 12 or 13, further comprising: determining, using the processor, that transmission of the non-SPS basic safety message at the non-SPS transmit time will result in an amount of time between the non-SPS time and a transmit time at which the second basic safety message is to be transmitted exceeds the SPS periodicity; and selecting, using the modem, a resource prior to the non-SPS transmit time for transmission of the non-SPS basic safety message based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein transmission of the non-SPS basic safety message in the selected resource is to satisfy the SPS periodicity. Aspect 17: The method of Aspect 12 or 13, further comprising: determining, using the processor, that transmission of the non-SPS basic safety message at the non-SPS transmit time will result in an amount of time between the non-SPS time and a transmit time at which the second basic safety message is to be transmitted exceeds the SPS periodicity; and selecting, using the modem, the non-SPS transmit time based at least in part on the determination that the transmission of the non-SPS basic safety message at the non-SPS transmit time will result in the amount of time between the non-SPS time and the transmit time at which the second basic safety message is to be transmitted exceeds the SPS periodicity, wherein the non-SPS transmit time is within a threshold time range associated with the transmit time at which the second basic safety message is to be transmitted.

Aspect 18: The method of any of Aspects 1-17, further comprising: providing, using a processor of the UE executing a safety application and to a modem of the UE, a request for an adjusted SPS periodicity; configuring, using the modem, the adjusted SPS periodicity at a reselection opportunity; and receiving, using the processor, an indication of an anchor time for transmission of the one or more basic safety messages that is based at least in part on the adjusted SPS periodicity. Aspect 19: The method of Aspect 18, wherein the adjusted SPS periodicity is higher relative to the SPS periodicity; and wherein generating the one or more basic safety messages comprises: generating the one or more basic safety messages based at least in part on the SPS periodicity prior to the processor receiving the adjusted SPS periodicity.

Aspect 20: The method of Aspect 18, wherein the adjusted SPS periodicity is lower relative to the SPS periodicity; and wherein the method further comprises: generating, using the processor or the modem, one or more non-SPS basic safety messages at a frequency that is greater relative to the SPS periodicity prior to the processor receiving the adjusted SPS periodicity. Aspect 21: The method of any of Aspects 18-20, further comprising: providing, using the processor and to the modem, a request for another adjusted SPS periodicity prior to receiving the indication of the anchor time.

Aspect 22: The method of any of Aspects 18-20, wherein the reselection opportunity is based at least in part on a time of arrival of a most recent basic safety message of the one or more basic safety messages at the modem. Aspect 23: The method of any of Aspects 1-21, further comprising: providing, using a processor of the UE executing a safety application and to a modem of the UE, a request for an adjusted SPS periodicity; configuring, using the modem, the adjusted SPS periodicity at a reselection opportunity; and until the reselection opportunity, transmitting any packets that do not fit into a reserved SPS transmission into non-SPS transmissions. until the reselection opportunity, transmitting any packets that do not fit into a reserved SPS transmission into non-SPS transmissions.

Aspect 24: The method of Aspect 23, wherein the safety application generates basic safety messages at the latest adjusted SPS periodicity at all times. Aspect 25: The method of Aspect 23 or 24, wherein the reselection opportunity is based at least in part on a time of arrival of a most recent basic safety message of the one or more basic safety messages at the modem.

Aspect 26: An apparatus for wireless communication at a device, comprising a processor; memory coupled with the processor; and instructions stored in the memory and executable by the processor to cause the apparatus to perform the method of one or more Aspects of Aspects 1-25. Aspect 27: A device for wireless communication, comprising a memory and one or more processors coupled to the memory, the memory and the one or more processors configured to perform the method of one or more Aspects of Aspects 1-25. Aspect 28: An apparatus for wireless communication, comprising at least one means for performing the method of one or more Aspects of Aspects 1-25.

Aspect 29: A non-transitory computer-readable medium storing code for wireless communication, the code comprising instructions executable by a processor to perform the method of one or more Aspects of Aspects 1-25. Aspect 30: A non-transitory computer-readable medium storing a set of instructions for wireless communication, the set of instructions comprising one or more instructions that, when executed by one or more processors of a device, cause the device to perform the method of one or more Aspects of Aspects 1-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting one or more first basic safety messages according to a semi-persistent scheduling (SPS) periodicity for transmitting basic safety messages, wherein the one or more first basic safety messages are generated according to a first basic safety message generating periodicity that is different from the SPS periodicity for transmitting basic safety messages;
    adjusting, based at least in part on the SPS periodicity for transmitting basic safety messages, the first basic safety message generating periodicity to a second basic safety message generation periodicity; and
    transmitting, based at least in part on the adjustment, one or more second basic safety messages according to the SPS periodicity, wherein the one or more second basic safety messages are generated according to the second basic safety message generation periodicity.

2. The method of claim 1, wherein adjusting the first basic safety message generating periodicity comprises:
    rounding the first basic safety message generating periodicity up or down to a multiple of a 100 millisecond periodicity
    rounding the first basic safety message generating periodicity up or down to a multiple of the SPS periodicity, or
    rounding the first basic safety message generating periodicity up or down to a nearest periodicity that is permitted by a specification.

3. The method of claim 1, further comprising:
    receiving, from a modem of the UE and at a processor of the UE executing a safety application, an indication of an anchor time that is based at least in part on a resource selection for the safety application; and
    wherein generating the one or more second basic safety messages comprises:
        generating, using the processor, a second basic safety message of the one or more second basic safety messages at an offset time prior to the anchor time; and
        providing the second basic safety message to the modem.

4. The method of claim 3, wherein generating the one or more second basic safety messages comprises:
    generating, using the processor, another second basic safety message of the one or more second basic safety messages at the offset time prior to another time, wherein the another time corresponds to one or more periods of the SPS periodicity after the anchor time; and
    providing the another second basic safety message to the modem.

5. The method of claim 1, further comprising:
    receiving, at a modem of the UE, an indication of a resource reselection associated with a safety application that is associated with the one or more second basic safety messages;
    determining, using the modem, an updated anchor time based at least in part on the resource reselection; and
    providing, from the modem and to a processor of the UE executing the safety application, an indication of the updated anchor time.

6. The method of claim 5, wherein generating the one or more second basic safety messages comprises:
    generating, using the processor, a second basic safety message of the one or more second basic safety messages at an offset time prior to the updated anchor time, wherein an amount of time between a time at which the second basic safety message is to be transmitted and a time at which another second basic safety message most recently generated by the UE is to be transmitted exceeds the SPS periodicity.

7. The method of claim 5, further comprising:
    determining, using the processor, that transmission of one second basic safety message of the one or more second basic safety messages at the updated anchor time will result in an amount of time between the updated anchor time and a time at which another second basic safety message most recently generated by the UE is to be transmitted exceeds the SPS periodicity; and
    generating, using the processor, a non-SPS basic safety message based at least in part on the determination that the transmission of the one second basic safety message at the updated anchor time will result in the amount of time between the updated anchor time and the time at which the another second basic safety message most recently generated by the UE is to be transmitted exceeds the SPS periodicity,
    wherein the non-SPS basic safety message is generated after generation of the one second basic safety message and prior to generation of the another second basic safety message.

8. The method of claim 5, further comprising:
    determining, using the modem, that transmission of one second basic safety message of the one or more second basic safety messages at the updated anchor time will result in an amount of time between the updated anchor time and a time at which another second basic safety message most recently generated by the UE is to be transmitted exceeds the SPS periodicity; and
    selecting, using the modem, a resource prior to the updated anchor time for transmission of the one second basic safety message based at least in part on the determination that the transmission of the one second basic safety message at the updated anchor time will result in the amount of time between the updated anchor time and the time at which the another second basic safety message most recently generated by the UE is to be transmitted exceeds the SPS periodicity,
    wherein transmission of the one second basic safety message in the selected resource is to satisfy the SPS periodicity.

9. The method of claim 1, further comprising:
    receiving, from a modem of the UE and at a processor of the UE executing a safety application, an indication of respective transmit times for each of the one or more second basic safety messages,
        wherein the respective transmit times are based at least in part on a resource selection for the safety application and the SPS periodicity; and wherein generating the one or more second basic safety messages comprises:
  generating, using the processor, the second one or more basic safety messages at an offset time prior to the respective transmit times.

10. The method of claim 9, further comprising:
  receiving, from the modem and at the processor, an indication of a non-SPS transmit time for transmission of a non-SPS basic safety message transmission between one second basic safety message of the one or more second basic safety messages and another second basic safety message of the one or more second basic safety messages; and
  generating, using the processor, the non-SPS basic safety message at the offset time prior to the non-SPS transmit time.

11. The method of claim 10, wherein an amount of time between the non-SPS transmit time and a transmit time at which the another second basic safety message is to be transmitted exceeds the SPS periodicity.

12. The method of claim 10, further comprising:
  determining, using the modem, that transmission of a message at a non-SPS transmission due to a muting event for an SPS flow is needed;
  determining an optimal resource selection time for the non-SPS transmission based at least in part on a minimum scheduling delay T1 and a maximum scheduling delay T2,
    wherein T2 is based at least in part on a current load on the processor, and
    wherein the optimal resource selection time minimizes a maximum amount of time between successive transmission; and
  selecting a resource for the non-SPS transmission at the optimal resource selection time.

13. The method of claim 10, further comprising:
  determining, using the processor, that transmission of the non-SPS basic safety message at the non-SPS transmit time will result in an amount of time between the non-SPS transmit time and a transmit time at which the another second basic safety message is to be transmitted exceeds the SPS periodicity; and
  generating, using the processor, another non-SPS basic safety message based at least in part on the determination that the transmission of the non-SPS basic safety message at the non-SPS transmit time will result in the amount of time between the non-SPS transmit time and the transmit time at which the another second basic safety message is to be transmitted exceeds the SPS periodicity,
  wherein the another non-SPS basic safety message is generated after generation of the non-SPS basic safety message and prior to generation of the another second basic safety message.

14. The method of claim 10, further comprising:
  determining, using the processor, that transmission of the non-SPS basic safety message at the non-SPS transmit time will result in an amount of time between the non-SPS transmit time and a transmit time at which the another second basic safety message is to be transmitted exceeds the SPS periodicity; and
  selecting, using the modem, a resource prior to the non-SPS transmit time for transmission of the non-SPS basic safety message based at least in part on the determination that the transmission of the non-SPS basic safety message at the non-SPS transmit time will result in the amount of time between the non-SPS transmit time and the transmit time at which the another second basic safety message is to be transmitted exceeds the SPS periodicity,
  wherein transmission of the non-SPS basic safety message in the selected resource is to satisfy the SPS periodicity.

15. The method of claim 10, further comprising:
  determining, using the processor, that transmission of the non-SPS basic safety message at the non-SPS transmit time will result in an amount of time between the non-SPS transmit time and a transmit time at which the another second basic safety message is to be transmitted exceeds the SPS periodicity; and
  selecting, using the modem, the non-SPS transmit time based at least in part on the determination that the transmission of the non-SPS basic safety message at the non-SPS transmit time will result in the amount of time between the non-SPS transmit time and the transmit time at which the second another second basic safety message is to be transmitted exceeds the SPS periodicity,
  wherein the non-SPS transmit time is within a threshold time range associated with the transmit time at which the another second basic safety message is to be transmitted.

16. The method of claim 1, further comprising:
  providing, using a processor of the UE executing a safety application and to a modem of the UE, a request for an adjusted SPS periodicity;
  configuring, using the modem, the adjusted SPS periodicity at a reselection opportunity; and
  receiving, using the processor, an indication of an anchor time for transmission of the one or more basic second safety messages that is based at least in part on the adjusted SPS periodicity.

17. The method of claim 16, wherein the adjusted SPS periodicity is higher relative to the SPS periodicity; and
  wherein generating the one or more second basic safety messages comprises:
    generating the one or more second basic safety messages based at least in part on the SPS periodicity prior to the processor receiving the adjusted SPS periodicity.

18. The method of claim 16, wherein the adjusted SPS periodicity is lower relative to the SPS periodicity; and
  wherein the method further comprises:
    generating, using the processor or the modem, one or more non-SPS basic safety messages at a frequency that is greater relative to the SPS periodicity prior to the processor receiving the adjusted SPS periodicity.

19. The method of claim 18, further comprising:
  providing, using the processor and to the modem, a request for another adjusted SPS periodicity prior to receiving the indication of the anchor time.

20. The method of claim 16, wherein the reselection opportunity is based at least in part on a time of arrival of a most recent first basic safety message of the one or more basic first safety messages at the modem.

21. The method of claim 1, further comprising:
  providing, using a processor of the UE executing a safety application and to a modem of the UE, a request for an adjusted SPS periodicity;
  configuring, using the modem, the adjusted SPS periodicity at a reselection opportunity; and
  until the reselection opportunity, transmitting any packets that do not fit into a reserved SPS transmission into non-SPS transmissions.

22. The method of claim 21, wherein the safety application generates basic safety messages at a latest adjusted SPS periodicity at all times.

23. The method of claim 21, wherein the reselection opportunity is based at least in part on a time of arrival of a most recent basic safety message of the one or more first basic safety messages at the modem.

24. The method of claim 1,
the second basic safety message generation periodicity is different from the SPS periodicity.

25. A user equipment (UE) for wireless communication, comprising:
one or more memories; and
one or more processors coupled to the one or more memories, the one or more memories and the one or more processors configured to:
transmit one or more first basic safety messages according to a semi-persistent scheduling (SPS) periodicity for transmitting basic safety messages, wherein the one or more first basic safety messages are generated according to a first basic safety message generating periodicity that is different from the SPS periodicity for transmitting basic safety messages;
adjust, based at least in part on the SPS periodicity for transmitting basic safety messages, the first basic safety message generating periodicity to a second basic safety message generation periodicity; and
transmit, based at least in part on the adjustment, one or more second basic safety messages according to the SPS periodicity, wherein the one or more second basic safety messages are generated according to the second basic safety message generation periodicity.

26. The UE of claim 25, wherein the one or more memories and the one or more processors, when adjusting the first basic safety message generating periodicity, are configured to:
round the first basic safety message generating periodicity up or down to a multiple of a 100 millisecond periodicity
round the first basic safety message generating periodicity up or down to a multiple of the SPS periodicity, or
round the first basic safety message generating periodicity up or down to a nearest periodicity that is permitted by a specification.

27. The UE of claim 25, wherein the one or more memories and the one or more processors are further configured to:
receive, from a modem of the UE and at a processor of the UE executing a safety application, an indication of an anchor time that is based at least in part on a resource selection for the safety application; and
wherein the one or more memories and the one or more processors, when generating the one or more second basic safety messages, are configured to:
generate, using the processor, a second basic safety message of the one or more second basic safety messages at an offset time prior to the anchor time; and
provide the second basic safety message to the modem.

28. A non-transitory computer-readable medium storing one or more instructions for wireless communication, the one or more instructions comprising:
one or more instructions that, when executed by one or more processors of a user equipment (UE), cause the one or more processors to:
transmit one or more first basic safety messages according to a semi-persistent scheduling (SPS) periodicity for transmitting basic safety messages, wherein the one or more first basic safety messages are generated according to a first basic safety message generating periodicity that is different from the SPS periodicity for transmitting basic safety messages;
adjust, based at least in part on the SPS periodicity for transmitting basic safety messages, the first basic safety message generating periodicity to a second basic safety message generation periodicity; and
transmit, based at least in part on the adjustment, one or more second basic safety messages according to the SPS periodicity, wherein the one or more second basic safety messages are generated according to the second basic safety message generation periodicity.

29. The non-transitory computer-readable medium of claim 28, wherein the one or more instructions, that cause the one or more processors to adjust the first basic safety message generating periodicity, cause the one or more processors to:
round the first basic safety message generating periodicity up or down to a multiple of a 100 millisecond periodicity
round the first basic safety message generating periodicity up or down to a multiple of the SPS periodicity, or
round the first basic safety message generating periodicity up or down to a nearest periodicity that is permitted by a specification.

30. A apparatus for wireless communication, comprising:
means for transmitting one or more first basic safety messages according to a semi-persistent scheduling (SPS) periodicity for transmitting basic safety messages, wherein the one or more first basic safety messages are generated according to a first basic safety message generating periodicity that is different from the SPS periodicity for transmitting basic safety messages;
means for adjusting, based at least in part on the SPS periodicity for transmitting basic safety messages, the first basic safety message generating periodicity to a second basic safety message generation periodicity; and
means for transmitting, based at least in part on the adjustment, one or more second basic safety messages according to the SPS periodicity, wherein the one or more second basic safety messages are generated according to the second basic safety message generation periodicity.

* * * * *